(12) United States Patent
Zhu et al.

(10) Patent No.: US 11,994,616 B2
(45) Date of Patent: May 28, 2024

(54) METHOD AND APPARATUS FOR DETECTING RADAR WAVE OFFSET

(71) Applicant: SZ DJI TECHNOLOGY CO., LTD., Shenzhen (CN)

(72) Inventors: Huangjian Zhu, Shenzhen (CN); Bin Huang, Shenzhen (CN); Hongshi Tan, Shenzhen (CN); Wenxin Hu, Shenzhen (CN); Chunming Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 747 days.

(21) Appl. No.: 17/090,263

(22) Filed: Nov. 5, 2020

(65) Prior Publication Data

US 2021/0231773 A1    Jul. 29, 2021

Related U.S. Application Data

(63) Continuation of application No. PCT/CN2019/077854, filed on Mar. 12, 2019.

(51) Int. Cl.
*G01S 7/40* (2006.01)
*G01S 7/497* (2006.01)
(Continued)

(52) U.S. Cl.
CPC .............. *G01S 7/4026* (2013.01); *G01S 7/40* (2013.01); *G01S 7/403* (2021.05); *G01S 7/4972* (2013.01);
(Continued)

(58) Field of Classification Search
CPC ........ G01S 13/426; G01S 13/933; G01S 7/40; G01S 7/4026; G01S 7/403; G01S 7/4091; G01S 7/4972; G01S 7/52004
See application file for complete search history.

(56) References Cited

U.S. PATENT DOCUMENTS 6,025,797 A      2/2000   Kawai et al.
2017/0336496 A1  11/2017  Fujii et al.
(Continued)

FOREIGN PATENT DOCUMENTS

CN    105629990 A    6/2016
CN    106338718 A    1/2017
(Continued)

OTHER PUBLICATIONS

The World Intellectual Property Organization (WIPO) International Search Report and Written Opinion for PCT/CN2019/077854 dated Dec. 18, 2019 9 Pages.
(Continued)

*Primary Examiner* — Timothy X Pham
(74) *Attorney, Agent, or Firm* — ANOVA LAW GROUP, PLLC

(57) ABSTRACT

A method includes receiving first measurement data acquired by a radar based on radar signals reflected by a member of a movable device. The method also includes calculating an angle based on the first measurement data. The method also includes comparing the angle with a predetermined reference angle to obtain a difference. The method also includes adjusting an obstacle detection angle of the radar based on the difference. The method further includes causing the radar to scan an environment in the adjusted obstacle detection angle.

19 Claims, 19 Drawing Sheets

(51) Int. Cl.
*G01S 7/52* (2006.01)
*G01S 13/42* (2006.01)
*G01S 13/933* (2020.01)

(52) U.S. Cl.
CPC ........ *G01S 7/52004* (2013.01); *G01S 13/933* (2020.01); *G01S 13/426* (2013.01)

(56) References Cited

U.S. PATENT DOCUMENTS

| | | | |
|---|---|---|---|
| 2018/0203097 A1* | 7/2018 | Park | G01S 7/4026 |
| 2020/0011970 A1* | 1/2020 | Abari | G01S 13/931 |
| 2021/0053675 A1* | 2/2021 | Agronov | B64C 27/52 |
| 2021/0089058 A1* | 3/2021 | Stoschek | G08G 5/0021 |
| 2022/0113376 A1* | 4/2022 | Zechner | G01S 7/403 |

FOREIGN PATENT DOCUMENTS

| | | |
|---|---|---|
| CN | 106643640 A | 5/2017 |
| CN | 108663067 A | 10/2018 |
| CN | 109144082 A | 1/2019 |
| EP | 3318889 A1 | 5/2018 |
| WO | 2011048831 A1 | 4/2011 |
| WO | 2017146824 A1 | 8/2017 |
| WO | 2018182737 A1 | 10/2018 |

OTHER PUBLICATIONS

Wikipedia, Random Sample Consensus, last edited on Oct. 14, 2020 https://en.wikipedia.org/w/index.php?title=Random_sample_consensus&oldid=983497063.

Huiyan Chen etc. "Theory and Design of Unmanned Vehicles", Beijing Institute of Technology Press, p. 22, Mar. 2018.

* cited by examiner

515

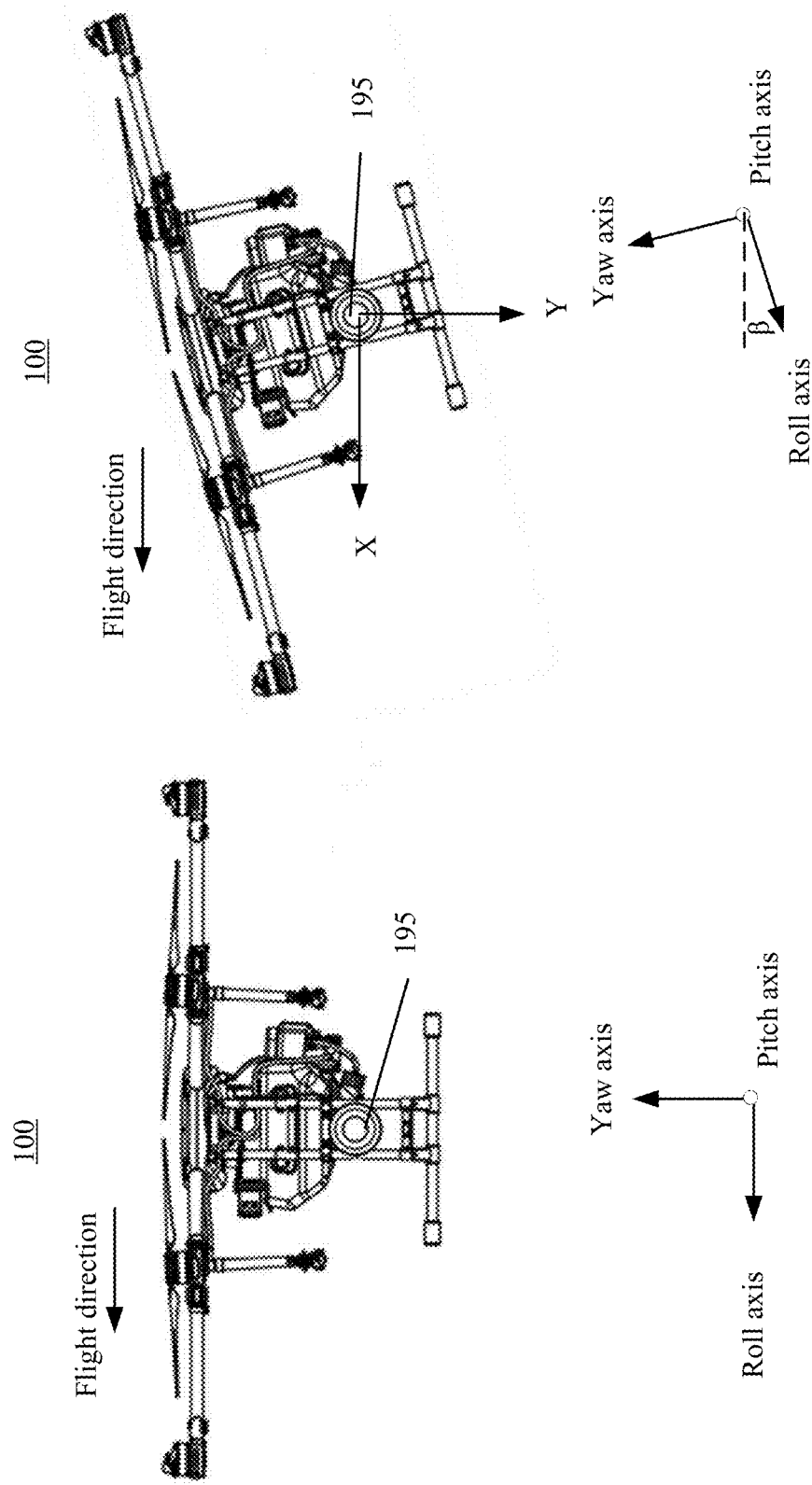

1400

1405 Receive first measurement data acquired by a radar based on radar signals reflected by a member of a movable device

1410 Calculate an angle based on the first measurement data

1415 Compare the angle with a predetermined reference angle to obtain a difference

1420 Determine an adjusted obstacle detection angle of the radar based on a specified obstacle detection angle and the difference

1425 Select second measurement data relating to an environment acquired by the radar corresponding to the adjusted obstacle detection angle

1430 Determine whether there is an obstacle in the specified obstacle detection angle based on the second measurement data

1505 — Obtain measurement data relating to the attitude of the unmanned aerial vehicle from one or more attitude sensors when the unmanned aerial hovers in a horizontally stable state

1510 — Calculate an average value of a parameter relating to the attitude based on the measurement data

1515 — Compare the average value of the parameter with a first predetermined threshold

1520 — Compare the average value of the parameter with a stored average value of the parameter to obtain a difference when the average value of the parameter is greater than the first predetermined threshold

1525 — Compare the difference with a second predetermined threshold and a third predetermined threshold

1530 — Calculate an angle offset based on the difference when the difference is greater than the second predetermined threshold and smaller than or equal to the third predetermined threshold

1535 — Adjust an obstacle detection angle of a radar based on the angle offset

FIG. 15

METHOD AND APPARATUS FOR DETECTING RADAR WAVE OFFSET

CROSS-REFERENCE TO RELATED APPLICATION

This application is a continuation of International Application No. PCT/CN2019/077854, filed Mar. 12, 2019, the entire content of which is incorporated herein by reference.

TECHNICAL FIELD

The present disclosure relates to the technology field of radar and, more particularly, to a method and apparatus for detecting radar wave offset.

BACKGROUND

Movable platforms, such as unmanned aerial vehicles ("UAVs") have been widely used in various fields, such as agriculture, power line inspection, photography, surveillance, etc. When a UAV flies in the air, the UAV may encounter various objects, such as a tree, a building, another aircraft, etc. UAVs may be provided with radars to detect objects in the surrounding environment, such as obstacles in a flight path. Various radars may be implemented, including rotating radars, laser radars, etc. Radar may emit a radar wave in a specified direction (e.g., an obstacle detection angle or direction) to scan a space to detect an object. Due to various reasons, such as vibrations or mounting errors, the position and/or orientation of the radar may deviate from the original position and/or orientation when the radar was first mounted. The change in the position and/or orientation of the radar may cause an offset in the direction of the radar wave. For example, when a rotating radar is properly mounted (e.g., calibrated), the 0 degree scale on a grating disk of the rotating radar may correspond to a horizontal front direction (or moving direction in a horizontal plane) of the UAV. The horizontal front direction may be the direction in which the radar is supposed to scan for objects (e.g., an original, specified obstacle detection angle or direction). However, due to mounting errors and/or vibrations, the radar may have deviated from its original mounting position and/or orientation, such that there is an offset in the relationship between the horizontal front direction and the 0 degree scale. This results in an offset in the direction of the radar wave. For example, when a radar wave is supposed to be emitted in the 0 degree direction, it may have actually been emitted in a 5 degree direction. Thus, there is an offset of 5 degrees in the radar wave, which may affect detection of an obstacle in the environment. In some situations, the radar may not be able to detect an obstacle due to a significant offset.

Distance measuring sensors, such as radars, may use attitude information output from one or more attitude sensors included in the UAV to adjust the obstacle detection angle. The attitude sensors may include, for example, an inertial measurement unit ("IMU"), a global positioning system ("GPS") sensor, a compass, etc. The attitude sensors may measure attitude information (e.g., pitch angle, roll angle, and yaw angle) of the UAV. Errors may exist in the measurement data output from the attitude sensor. The errors may be caused by various factors, such as temperature changes and/or humidity changes in the attitude sensors. The errors in the measurement data output from the attitude sensors may cause an offset in the radar wave (e.g., an offset in the obstacle detection angle).

Existing technologies for detecting the radar wave offset caused by changes in the position and/or orientation of the radar may include manually measuring the degree of tilting of the radar using, for example, a level, and adjusting the position and/or the orientation of the radar based on the measured degree of tilting. This manual measurement and adjustment may not be accurate, which may affect the accuracy of obstacle detection by the radar.

Existing technologies for compensating for the error caused by the temperature change in the IMU may include placing a suitable thermal-sensitive resistor in the IMU, and compensating for the error based on the change in the resistance. However, the thermal compensation method is not effective at the initial time period when the IMU is powered on and when the temperature of the environment is low.

Accordingly, there is a need to develop methods and apparatuses for detecting radar wave offset and/or compensating for the radar wave offset.

SUMMARY

An embodiment of the present disclosure provides a method including receiving first measurement data acquired by a radar based on radar signals reflected by a member of a movable device. The method also includes calculating an angle based on the first measurement data. The method also includes comparing the angle with a predetermined reference angle to obtain a difference. The method also includes adjusting an obstacle detection angle of the radar based on the difference. The method further includes causing the radar to scan an environment in the adjusted obstacle detection angle.

An embodiment of the present disclosure provides a method. The method includes receiving first measurement data acquired by a radar based on radar signals reflected by a member of a movable device. The method also includes calculating an angle based on the first measurement data. The method also includes comparing the angle with a predetermined reference angle to obtain a difference. The method also includes determining an adjusted obstacle detection angle of the radar based on a specified obstacle detection angle and the difference. The method also includes selecting second measurement data relating to an environment acquired by the radar corresponding to the adjusted obstacle detection angle. The method further includes determining whether there is an obstacle in the specified obstacle detection angle based on the second measurement data.

An embodiment of the present disclosure provides a method. The method includes obtaining measurement data relating to an attitude of an unmanned aerial vehicle from one or more attitude sensors when the unmanned aerial vehicle hovers in a horizontally stable state. The method also includes calculating an average value of a parameter relating to the attitude based on the measurement data. The method also includes comparing the average value of the parameter with a first predetermined threshold. The method also includes comparing the average value of the parameter with a stored average value of the parameter to obtain a difference when the average value of the parameter is greater than the first predetermined threshold. The method also includes comparing the difference with a second predetermined threshold and a third predetermined threshold. The method also includes calculating an angle offset based on the difference when the difference is greater than the second predetermined threshold and smaller than or equal to the third predetermined threshold. The method further includes adjusting an obstacle detection angle of a radar based on the angle offset.

An embodiment of the present disclosure provides a method. The method includes recording first measurement data as a radar rotates 360 degrees and scans an environment. The method also includes determining an offset in an angle relating to a radar wave based on the first measurement data. The method also includes calculating, for each specified obstacle detection angle, an adjusted obstacle detection angle based on the specified obstacle detection angle and the offset. The method further includes selecting data from the first measurement data corresponding to the adjusted obstacle detection angle as data for the specified obstacle detection angle.

An embodiment of the present disclosure provides a method. The method includes obtaining a specified scanning angle for a radar. The method also includes determining an offset in an angle relating to a radar wave. The method also includes calculating an adjusted scanning angle based on the specified scanning angle and the offset. The method further includes positioning the radar to the adjusted scanning angle and scanning an environment at the adjusted scanning angle.

An embodiment of the present disclosure provides an unmanned aerial vehicle. The unmanned aerial vehicle includes a body. The unmanned aerial vehicle also includes a radar mounted to the body and configured to emit a radar wave for detecting an obstacle in an environment. The unmanned aerial vehicle also includes a controller comprising a memory configured to store instructions and a processor configured to execute the instructions to receive first measurement data acquired by the radar based on radar signals reflected by a member of the unmanned aerial vehicle. The processor is also configured to calculate an angle based on the first measurement data. The processor is also configured to compare the angle with a predetermined reference angle to obtain a difference. The processor is also configured to adjust an obstacle detection angle of the radar based on the difference. The processor is further configured to cause the radar to scan the environment in the adjusted obstacle detection angle.

An embodiment of the present disclosure provides an unmanned aerial vehicle. The unmanned aerial vehicle includes a body. The unmanned aerial vehicle also includes a radar mounted to the body and configured to emit a radar wave for detecting an obstacle in an environment. The unmanned aerial vehicle also includes a controller comprising a memory configured to store instructions and a processor configured to execute the instructions to receive first measurement data acquired by the radar based on radar signals reflected by a member of the unmanned aerial vehicle. The processor is also configured to calculate an angle based on the first measurement data. The processor is also configured to compare the angle with a predetermined reference angle to obtain a difference. The processor is also configured to determine an adjusted obstacle detection angle of the radar based on a specified obstacle detection angle and the difference. The processor is also configured to select second measurement data relating to an environment acquired by the radar corresponding to the adjusted obstacle detection angle as measurement data corresponding to the specified obstacle detection angle. The processor is further configured to determine whether there is an obstacle in the specified obstacle detection angle based on the second measurement data.

An embodiment of the present disclosure provides an unmanned aerial vehicle. The unmanned aerial vehicle includes a body. The unmanned aerial vehicle also includes a radar mounted to the body and configured to emit a radar wave for detecting an obstacle in an environment. The unmanned aerial vehicle also includes a controller comprising a memory configured to store instructions and a processor configured to obtain measurement data relating to an attitude of the unmanned aerial vehicle from one or more attitude sensors when the unmanned aerial vehicle hovers in a horizontally stable state. The processor is also configured to calculate an average value of a parameter relating to the attitude based on the measurement data. The processor is also configured to compare the average value of the parameter with a first predetermined threshold. The processor is also configured to compare the average value of the parameter with a stored average value of the parameter to obtain a difference when the average value of the parameter is greater than the first predetermined threshold. The processor is also configured to compare the difference with a second predetermined threshold and a third predetermined threshold. The processor is also configured to calculate an angle offset based on the difference when the difference is greater than the second predetermined threshold and smaller than or equal to the third predetermined threshold. The processor is further configured to adjust the obstacle detection angle of the radar based on the angle offset.

An embodiment of the present disclosure provides an unmanned aerial vehicle. The unmanned aerial vehicle includes a body. The unmanned aerial vehicle also includes a radar mounted to the body and configured to emit a radar wave for detecting an obstacle in an environment. The unmanned aerial vehicle also includes a controller comprising a memory configured to store instructions and a processor configured to record first measurement data as the radar rotates 360 degrees and scans an environment. The processor is also configured to determine an offset in an angle relating to a radar wave. The processor is also configured to calculate, for each specified obstacle detection angle, an adjusted obstacle detection angle based on the specified obstacle detection angle and the offset. The processor is further configured to select data from the first measurement data corresponding to the adjusted obstacle detection angle as data for the specified obstacle detection angle.

An embodiment of the present disclosure provides an unmanned aerial vehicle. The unmanned aerial vehicle includes a body. The unmanned aerial vehicle also includes a radar mounted to the body and configured to emit a radar wave for detecting an obstacle in an environment. The unmanned aerial vehicle also includes a controller comprising a memory configured to store instructions and a processor configured to obtain a specified scanning angle for the radar. The processor is also configured to determine an offset in an angle relating to a radar wave. The processor is also configured to calculate an adjusted scanning angle based on the specified scanning angle and the offset. The processor is further configured to position the radar to the adjusted scanning angle and scanning an environment at the adjusted scanning angle.

An embodiment of the present disclosure provides a method for automatic calibration of a distance measuring sensor. The method includes obtaining measurement data by the distance measuring sensor using one or more members of a movable platform as a detection target, wherein the distance measuring sensor is mounted on the movable platform. The method also includes determining detection information relating to the one or more members of the movable platform based on the measurement data. The method further includes determining whether the distance measuring sensor needs to be calibrated based on the detection information.

An embodiment of the present disclosure provides a distance measuring sensor. The distance measuring sensor includes a signal transceiver configured to obtain measurement data relating to a detection target. The distance measuring sensor also includes a controller electrically coupled with the signal transceiver and configured to obtain the measurement data using one or more members of a movable platform as a detection target, wherein the distance measuring sensor is mounted on the movable platform. The controller is also configured to determine detection information relating to the one or more members of the movable platform based on the measurement data. The controller is further configured to determine whether the distance measuring sensor needs to be calibrated based on the detection information.

An embodiment of the present disclosure provides a movable platform including a body and a distance measuring sensor mounted on the body. The distance measuring sensor includes a signal transceiver and a controller electrically coupled with the signal transceiver. The signal transceiver is configured to obtain measurement data relating to a detection target. The controller is configured to obtain the measurement data using one or more members of a movable platform as a detection target. The controller is also configured to determine detection information relating to the one or more members of the movable platform based on the measurement data. The controller is further configured to determine whether the distance measuring sensor needs to be calibrated based on the detection information.

An embodiment of the present disclosure provides a method for automatic calibration of a distance measuring sensor. The method includes obtaining attitude information of a movable platform configured to carry the distance measuring sensor. The method also includes determining whether to calibrate an observation angle of the distance measuring sensor for detecting an object based on the attitude information.

An embodiment of the present disclosure provides a distance measuring sensor. The distance measuring sensor includes a signal transceiver configured to receive detection signals relating to a detection target. The distance measuring sensor also includes a controller electrically coupled with the signal transceiver and configured to obtain attitude information of a movable platform configured to carry the distance measuring sensor. The controller is also configured to determine whether to calibrate an observation angle of the distance measuring sensor for detecting an object based on the attitude information.

An embodiment of the present disclosure provides a movable platform including a body and an attitude sensor configured to measure attitude information of the movable platform. The movable platform also includes a distance measuring sensor mounted on the body. The distance measuring senor includes a signal transceiver and a controller electrically coupled with the signal transceiver. The signal transceiver is configured to receive detection signals relating to a detection target. The controller is configured to obtain attitude information of the movable platform in a predetermined state. The controller is also configured to determine whether to calibrate an observation angle of the distance measuring sensor for detecting an object based on the attitude information.

It shall be understood that different aspects of the present disclosure can be appreciated individually, collectively, or in combination with each other. Various aspects of the present disclosure described herein may be applied to any of the particular applications set forth below or for any other types of devices other than UAVs, including, for example, ground vehicles, water surface vehicles, underwater vehicles, and space vehicles.

Other objects and features of the present disclosure will become apparent by a review of the specification, claims, and appended figures.

BRIEF DESCRIPTION OF THE DRAWINGS

The novel features of the present disclosure are set forth with particularity in the appended claims. A better understanding of the features and advantages of the present disclosure will be obtained by referencing to the following detailed description that sets forth illustrative embodiments, in which the principles of the present disclosure are utilized, and the accompanying drawings of which:

FIG. 10A illustrates a side view of the UAV in a state when a pitch angle is 0 degree, in accordance with an embodiment of the present disclosure.

FIG. 10B illustrates a side view of the UAV in a state when a pitch angle is non-zero, in accordance with an embodiment of the present disclosure.

FIG. 14 is a flow chart illustrating a method for detecting a radar wave offset, in accordance with another embodiment of the present disclosure.

FIG. 15 is a flow chart illustrating a method for detecting a radar wave offset, in accordance with another embodiment of the present disclosure.

DETAILED DESCRIPTION

Figure 1:
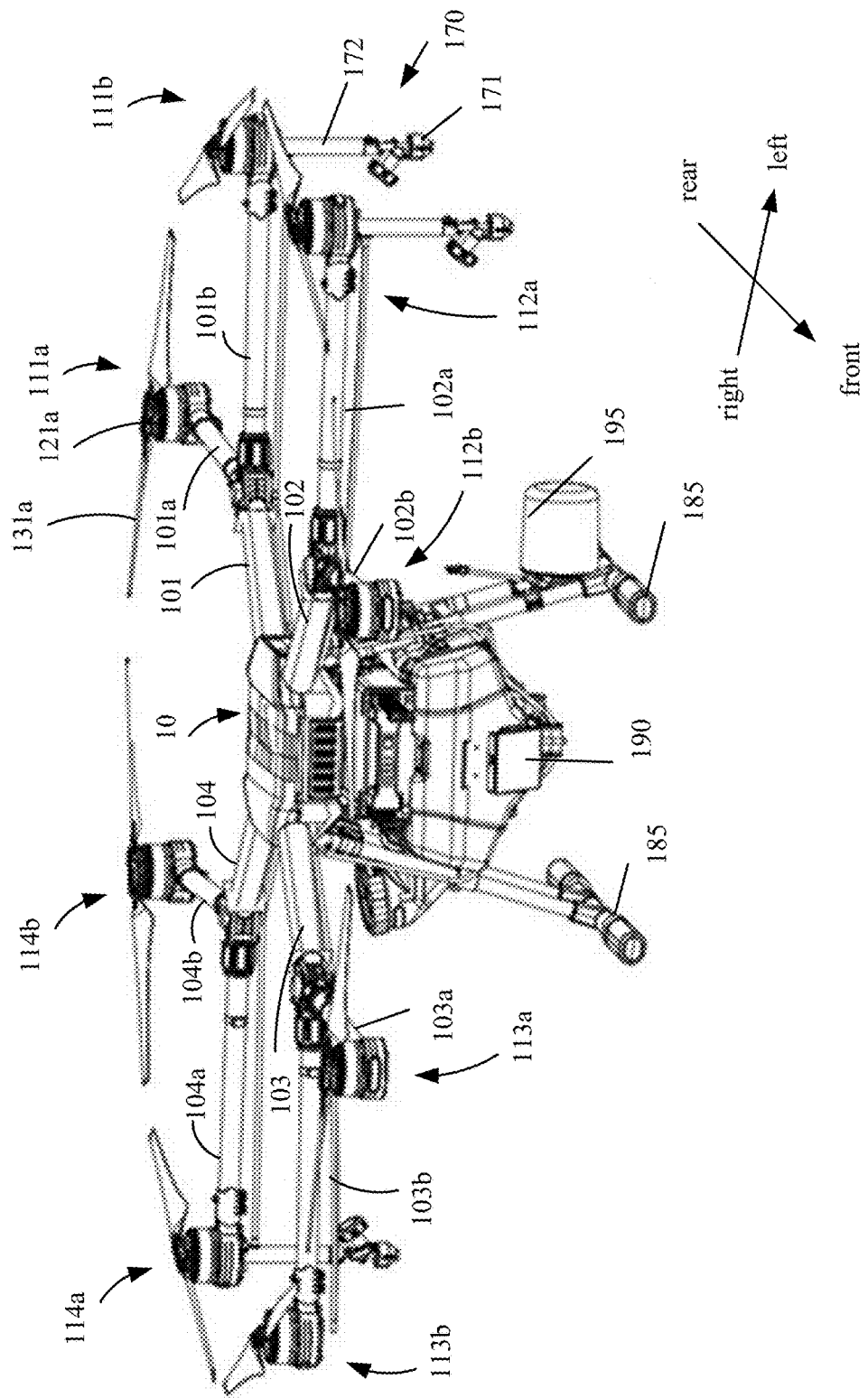
FIG. 1 is a perspective view of a UAV, in accordance with an embodiment of the present disclosure.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure. Example embodiments will be described with reference to the accompanying drawings, in which the same numbers refer to the same or similar elements unless otherwise specified.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. The term "coupled" may include mechanical and/or electrical coupling. When a first item is electrically coupled with a second item, the electrical coupling may include any suitable forms of electrical connections, such as, for example, wired and wireless connections.

When a first component is referred to as "connected" to or with a second component, it is intended that the first component may be directly connected to or with the second component or may be indirectly connected to or with the second component via an intermediate component. The connection may include mechanical and/or electrical connections. The electrical connection may be wired or wireless. The connection may be permanent or detachable.

When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "left," "right," "up," "upward," "down," "downward," "front," "rear," and similar expressions used herein are merely intended for description. The term "communicatively coupled" indicates that related items are coupled through a communication channel, such as a wired or wireless communication channel.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined. The following embodiments do not limit the sequence of execution of the steps included in the disclosed methods. The sequence of the steps may be any suitable sequence, and certain steps may be repeated.

FIG. 1 is a schematic diagram of a UAV. Although for illustration purposes, UAVs are used throughout the following descriptions, the disclosed methods and apparatuses are not limited to implementations in UAVs. The disclosed methods and apparatuses for detecting radar wave offset may be used in other movable devices, such as ground vehicles, space vehicles, water surface vehicles, automated guided vehicles, etc.

As shown in FIG. 1, a UAV 100 may include a body 10. The body 10 may include a plurality of frames for mounting other devices, such as a propulsion system, a power supply, a flight control board, a gimbal, a sensor system, a communication device, etc. In some embodiments, the UAV 100 may include a plurality of arms mounted to the body 10. Each arm may radially extend from a central frame of the body 10. In the embodiment shown in FIG. 1, the UAV 100 includes a first arm 101, a second arm 102, a third arm 103, a fourth arm 104, each mounted to a location of the body 10. Each arm may have a Y shape. Thus, each arm may include two branches. For example, the first arm 101 may include a first branch 101*a* and a second branch 101*b*. The second arm 102 may include a first branch 102*a* and a second branch 102*b*. The third arm 103 may include a first branch 103*a* and a second branch 103*b*. The fourth arm 104 may include a first branch 104*a* and a second branch 104*b*. In some embodiments, the UAV 100 may include other suitable number of arms, such as five, six, eight, ten, etc. In some embodiments, each arm of the UAV 100 may not include a Y shape, but rather, each arm may include a straight rod with one propulsion assembly mounted to the tip portion of the straight rod.

The UAV 100 may include a propulsion system mounted to the body 10. The propulsion system may be configured to provide a propulsion force to the UAV 100, such as for the flight of the UAV 100. The propulsion system may be mounted to the arms. For example, the propulsion system may include a plurality of propulsion assemblies each mounted to an arm. Each propulsion assembly may include a motor and a propeller. Each propulsion assembly may be mounted to a tip portion of each branch of each arm, as shown in FIG. 1. For example, a first propulsion assembly 111a may be mounted to the tip portion of the first branch 101a of the first arm 101. The first propulsion assembly 111 may include a first motor 121a and a first propeller 131a. A second propulsion assembly 111b may be mounted to the tip portion of the second branch 101b of the first arm 101. Although not labeled with reference numerals, as shown in FIG. 1, the second propulsion assembly 111b may include a second motor and a second propeller. Similarly, the first branch 102a of the second arm 102 is mounted with a propulsion assembly including a motor and a propeller at the tip portion of the first branch 102a. The second branch 102b of the second arm 102 is mounted with a propulsion assembly including a motor and a propeller at the tip portion of the second branch 102b. The first branch 103a of the third arm 103 is mounted with a propulsion assembly including a motor and a propeller at the tip portion of the first branch 103a. The second branch 103b of the third arm 103 is mounted with a propulsion assembly including a motor and a propeller at the tip portion of the second branch 103b. The first branch 104a of the fourth arm 104 is mounted with a propulsion assembly including a motor and a propeller at the tip portion of the first branch 104a. The second branch 104b of the fourth arm 104 is mounted with a propulsion assembly including a motor and a propeller at the tip portion of the second branch 104b.

In some embodiments, the UAV 100 may be used for spraying a fluid to a field. For example, the UAV 100 may be used for agriculture purposes. In some applications, the UAV 100 may be used to spray a fluid, such as a liquid fertilizer, an insect killer, etc., to a farm field. Thus, the UAV 100 may include one or more sprayers 170 mounted to one or more arms. For example, FIG. 1 shows that a sprayer 170 is mounted on the second branch 101b of the first arm 101. The sprayer 170 may include a spray nozzle 171 mounted to a tip portion of a rod 172. The rod 172 may be mounted to a bottom surface of the second branch 101b of the first arm 101. For example, the rod 172 may be mounted to the second branch 101b under the propulsion assembly 111b. Although FIG. 1 shows that only a few arms are mounted with the sprayer 170, a person having ordinary skill in the art can appreciate that a greater or smaller number of arms may be mounted with the sprayer 170.

The UAV 100 may include supporting legs 185 mounted to the body 10, and configured to support the UAV 100 when the UAV 100 is landed or rests on a surface, such as a ground or a floor. The UAV 100 may include a first radar 190 mounted to a lower portion of the body 10 between the two supporting legs. The first radar 190 may be configured to detect an object in a predetermined direction, such as under the UAV 100. The UAV 100 may include a second radar 195 mounted to a side of the UAV 100. For example, the second radar 195 may be mounted to one of the supporting legs 185. The second radar 195 may be a rotating radar (hence the second radar 195 may also be referred to as rotating radar 195), which rotates to scan the environment in 360 degrees. For example, the rotating radar 195 may set a direction relating to the UAV as the 0 degree position of the radar. For example, the 0 degree direction may be the direction facing the front (e.g., the forward flying direction) of the UAV 100. Example front-rear and left-right directions or sides are shown in FIG. 1. Details of the second radar 195 are shown in FIGS. 4-8, which are described below.

Figure 2:
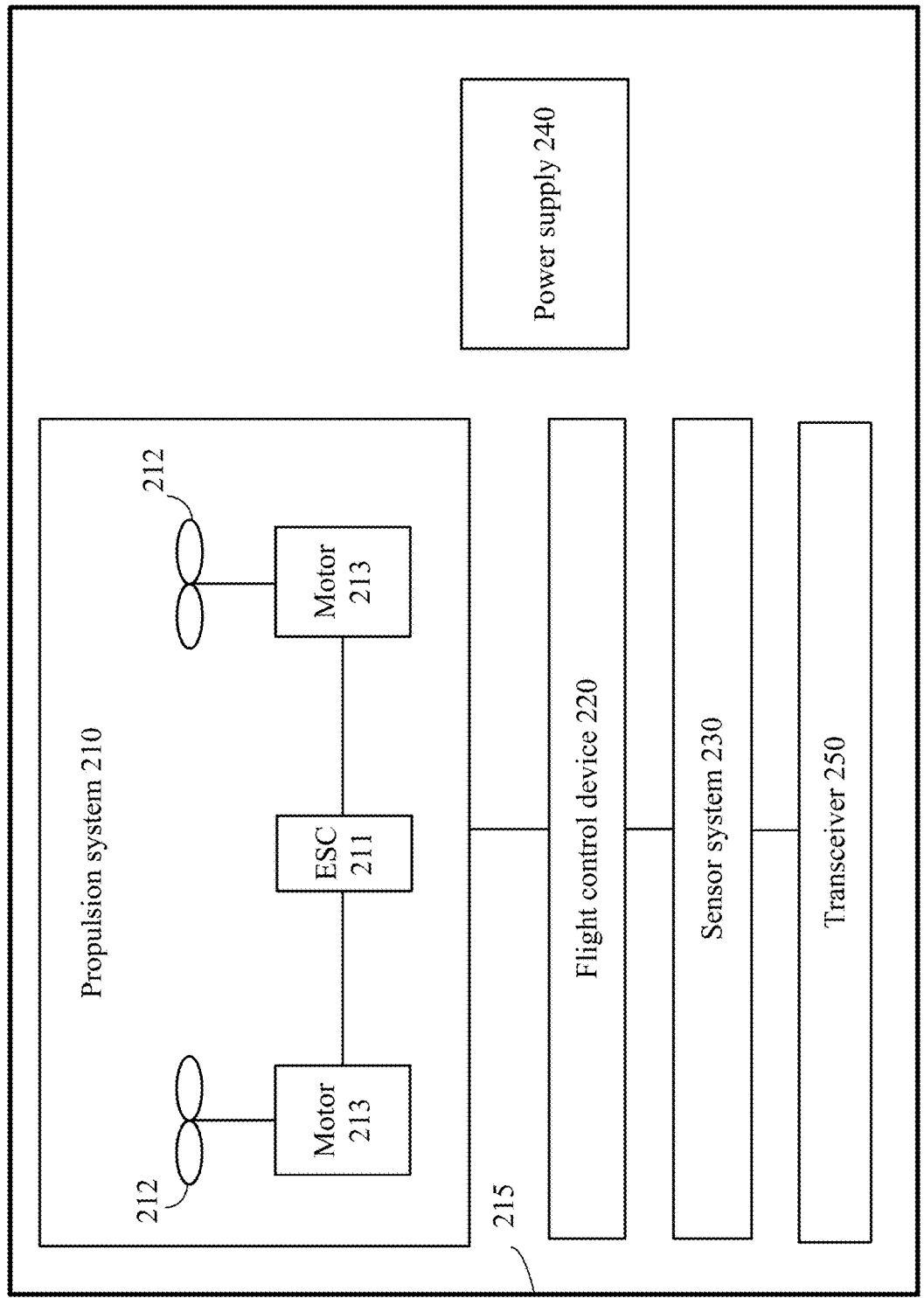
FIG. 2 is a schematic diagram of the UAV of FIG. 1, in accordance with an embodiment of the present disclosure.

FIG. 2 is a schematic diagram of UAV 100 of FIG. 1. FIG. 2 schematically illustrates some components of the UAV 100 that may not be shown in FIG. 1. As shown in FIG. 2, the UAV 100 may include a propulsion system 210 configured to provide a propulsion force for the UAV 100. Descriptions of the propulsion system shown in FIG. 1 applies to the propulsion system 210. The propulsion system 210 may include a plurality of propulsion assemblies, each of which may include a motor 213 and a propeller 212. In some embodiments, each propulsion assembly may also include an electric speed control ("ESC") 211. In some embodiments, an ESC 211 may be operably coupled with more than one propulsion assembly, e.g., more than one motor included in more than one propulsion assembly. In some embodiments, each propulsion assembly including the motor 213 and the propeller 212, and/or the ESC 211, may be mounted to a distal end portion or a tip portion of an arm.

The propulsion system 210 may be configured to provide a propulsion force (e.g., a lifting force and/or a thrust force) for the flight of the UAV 100. The propulsion system 210 may include any suitable number of propulsion assemblies, such as one, three, four, five, six, seven, eight, etc. In some embodiments, the motor 213 may be electrically and/or mechanically coupled between the ESC 211 and the propeller 212. The ESC 211 may be configured or programmed to receive a driving signal from a flight control device 220 included in the UAV 100. The ESC 211 may be configured to provide a driving current to the motor 213 based on the driving signal received from the flight control device 220, thereby controlling a rotating speed and/or a rotating direction of the motor 213. Each motor 213 may drive the propellers 212 to rotate, thereby providing a propulsion force for the flight of the UAV 100.

The UAV 100 may include a flight control device 220 (or controller 220). The flight control device 220 may be operably coupled with various components or devices included in the UAV 100 through suitable mechanical and/or electrical couplings. The flight control device 220 may include various hardware, such as circuit, gate, chip, memory, processor, etc. The flight control device 220 may function as a central controller for controlling the flight and/or the operations of various components or devices included in the UAV 100. For example, the flight control device 220 may be configured to generate a driving signal for the ESC 211 to control the rotating speed and/or the rotating direction of the motor 213. The flight control device 220 may also control the pitch angle, the yaw angle, and the roll angle of the UAV 100 during flight. In some embodiments, the flight control device 220 may be configured to control the operation of other devices mounted on the UAV 100, including, for example, the rotating radar 195, as described below.

Figure 3:
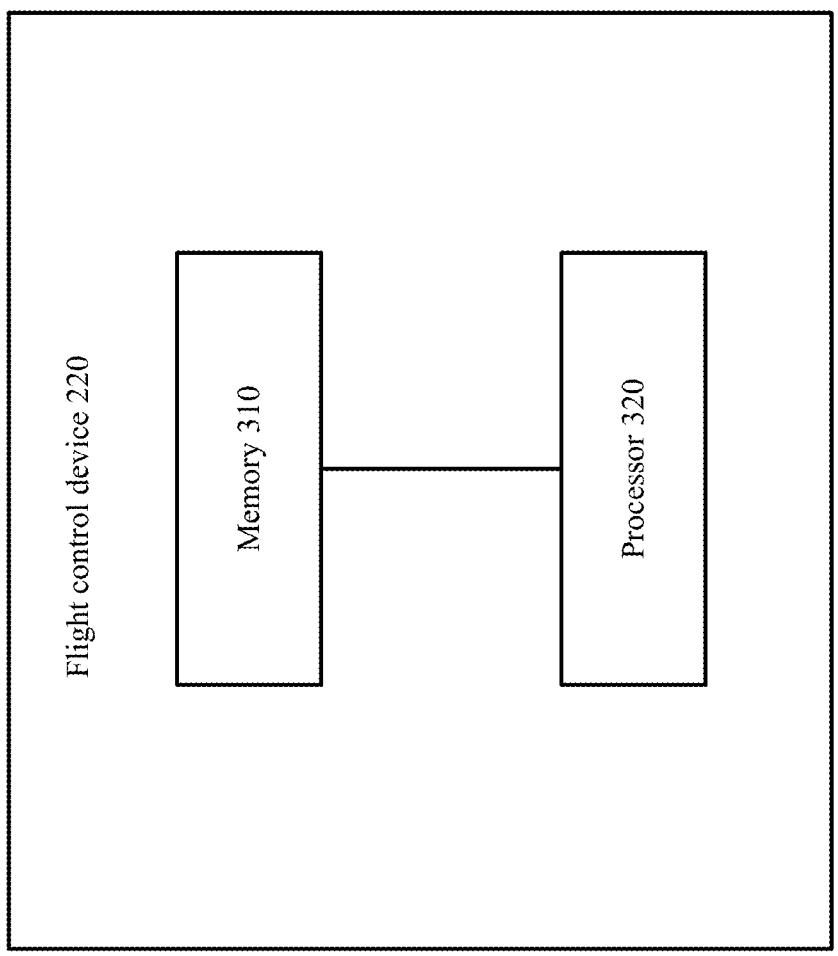
FIG. 3 is a schematic diagram of a flight control device, in accordance with an embodiment of the present disclosure.

FIG. 3 is a schematic diagram of the flight control device 220. The flight control device 220 may include at least one of a memory 310 and a processor 320. The memory 310 may be configured to store computer-executable instructions or codes. The memory 310 may include any suitable memory, such as a flash memory, a random access memory ("RAM"), a read-only memory ("ROM"), a programmable read-only memory ("PROM"), a field programmable read-only memory ("FPROM"), etc. The processor 320 may include any suitable processor, such as a central processing unit ("CPU"), a microprocessor, an application-specific instruction set processor ("ASIP"), a graphics processing unit ("GPU"), a physics processing unit ("PPU"), a digital signal processor ("DSP"), a network processor, etc. The processor may be a single-core processor or a multi-core processor. The processor 320 may include various hardware components, such as circuits, gates, logic elements, etc. The processor 320 may be configured to access the memory 310 and execute the instructions stored therein to perform various methods disclosed herein, including the methods for detecting the radar wave offset of the rotating radar 195. The processor 320 may also be configured to execute the methods for calibrating the rotating radar 195, e.g., by correcting the radar wave offset caused by a deviation from a predetermined mounting location and/or orientation, or caused by a measurement error in an attitude sensor, such as an inertial measurement unit ("IMU"). In some embodiments, the flight control device 220 may include a hardware chip. The hardware chip may an application-specific integrated circuit ("ASIC"), a programmable logic device ("PLD"), or a combination thereof. The PLD may be a complex programmable logic device ("CPLD"), a field-programmable gate array ("FPGA"), a generic array logic ("GAL"), or any combination thereof.

Referring back to FIG. 2, the UAV 100 may include a sensor system 230 that may include any suitable sensors, such as a global positioning system ("GPS") sensor, a real-time kinematic sensor, a visual-inertial odometry sensor, an inertial measurement unit ("IMU"), a microphone, an altitude sensor, a speed sensor, an accelerometer, an imaging sensor (e.g., included in an imaging device carried by the UAV 100), an infrared sensor, a digital compass, a radar, a laser sensor, a thermal sensor, a night vision sensor, etc. The sensor system 230 may acquire, collect, detect, or measure information relating to the UAV 100 and the environment in which the UAV 100 is operated. For example, attitude sensors (e.g., IMU, GPS, and a compass) may collect attitude information of the UAV 100. In some embodiments, the GPS sensor may provide location information of the UAV 100. The IMU may provide at least one of a pitch angle, a roll angle, or a yaw angle of the UAV 100. The radar and/or laser sensor may provide a measurement of a distance between the UAV 100 and another neighboring UAV or obstacle. In some embodiments, the sensor system 230 may include the first radar 190 and the second radar 195 (rotating radar 195). The flight control device 220 may receive measurement data from the various sensors, and may process the measurement data to obtain information relating to the state of the UAV 100. In some embodiments, the flight control device 220 may process signals received from the rotating radar 195. In some embodiments, the flight control device 220 may detect a radar wave offset based on processing the signals received from the rotating radar 195 and/or signals received from the attitude sensors (e.g., GPS, IMU, and compass) relating to the attitude information of the UAV 100.

In some embodiments, the UAV 100 may include a transceiver 250 configured to communicate with a remote control device or terminal, a communication base station (such as a cellular telecommunication network), or a satellite. For example, the transceiver 250 may include at least one of a 3G, 4G, or 4G Long Term Evolution ("LTE") communication chip, a 5G or 5G New Radio ("NR") communication chip, a Bluetooth communication device, a Wi-Fi communication device, or any other communication devices that may provide a suitable range of communication. In some embodiments, the flight control device 220 may receive signals, through the transceiver 250, from a remote control terminal controlling the flight of the UAV 100.

As shown in FIG. 2, the UAV 100 may include a power supply 240 configured to supply power to the UAV 100, including various loads of the UAV 100, such as the propulsion system 210. In some embodiments, the power supply 240 may include a battery configured to supply electrical power to the electric motors 213 of the propulsion system 210. The battery may be any suitable battery, such as a rechargeable battery, a non-rechargeable battery, an alkaline battery, a Lithium Ion battery, a Nickel-Metal Hydride battery, a Nickel Cadmium battery, a lead acid battery, a Lithium Ion Polymer battery, etc. In some embodiments, the power supply may include a solar panel and a battery. The solar panel may be configured to convert solar energy into electricity, which may be stored in the battery. The power supply 240 may include any other suitable devices for providing the power to drive the propulsion assemblies included in the UAV 100. The power supply 240 may be mounted on the body 10 of the UAV 100. In some embodiments, the power supply 240 may be detachably mounted on the UAV 100, and may be detached for replacement or service.

Figure 4:
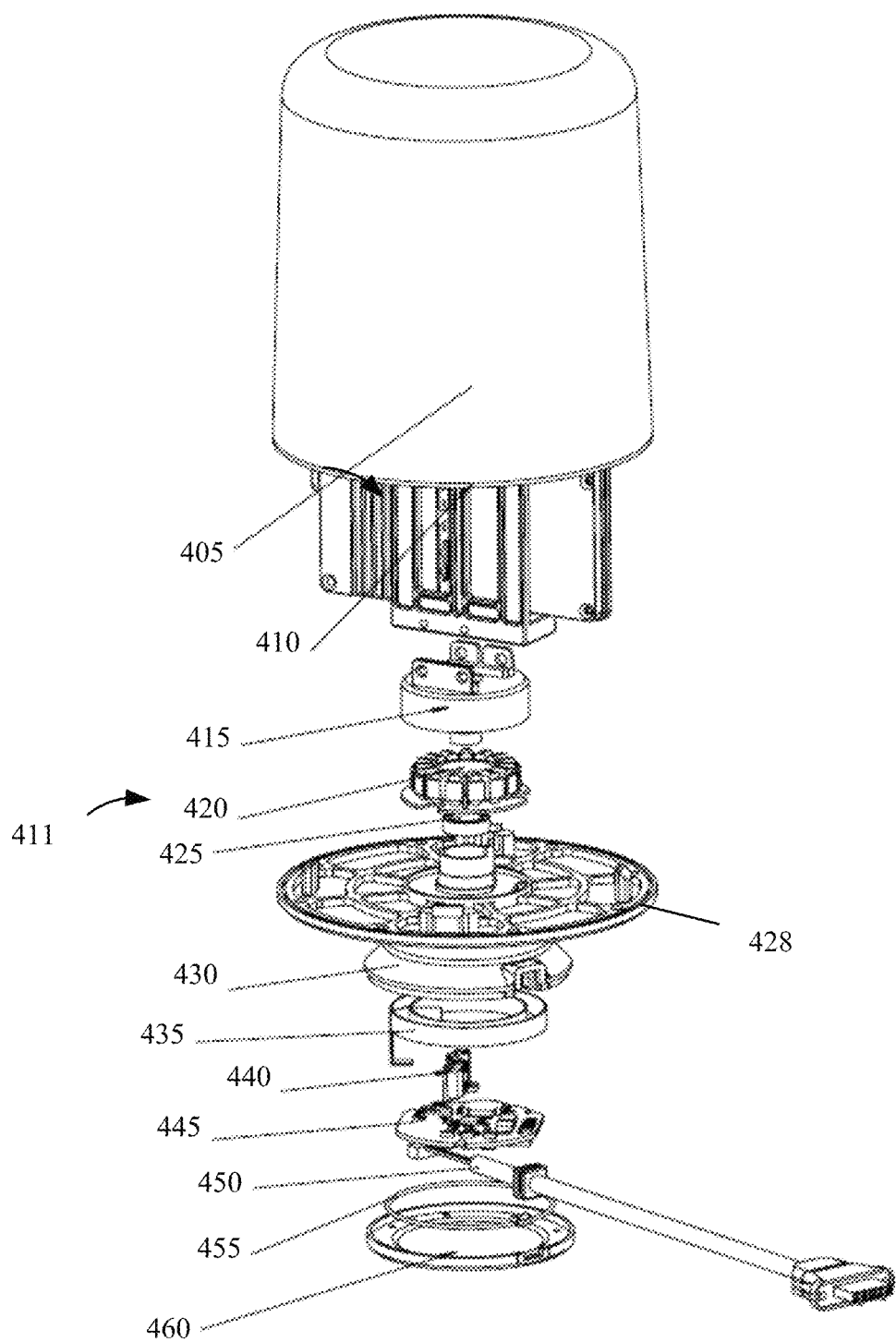
FIG. 4 is an exploded view of a rotating radar, in accordance with an embodiment of the present disclosure.

FIG. 4 is an exploded view of the rotating radar 195. The rotating radar 195 may include a cover 405. Although the cover 405 is shown to have a substantially cylindrical shape, the cover 405 may include other suitable shape. The rotating radar 195 may include a signal transceiver 410 (also referred to as a radar element 410) mounted on a supporting frame. The radar element 410 may include at least one of an emitter and a receiver. The emitter may be configured to emit a radar wave in a predetermined direction, which may be reflected by an object and received by the receiver included in the radar element 410. The radar wave may have a lobe that may be associated with an angle. For example, the radar wave may have a lobe spanning at about 9 degrees. The radar element 410 may be positioned or oriented to face a direction, and may scan the environment in that direction within the lobe (e.g., scanning a space about 9 degrees around that direction).

The rotating radar 195 may include an electric motor 411, which include a motor plate 415 coupled with the supporting frame of the radar element 410. The electric motor 411 may also include a motor coil 420 and a rotating shaft 425. The motor plate 415 may be mounted over the motor coil 420 to cover the motor coil 420. The motor coil 420 may be mounted on the rotating shaft 425. When the rotating shaft 425 and the motor coil 420 rotate, the motor plate 415 also rotates, causing the supporting frame of the radar element 410 to rotate. Thus, the radar element 410 may be rotated 0 to 360 degrees to face different directions. When the radar element 410 faces a direction (e.g., a 5 degree direction), the radar element 410 may emit a radar wave in that direction to detect an object in that direction.

The rotating radar 195 may include a grating assembly 428 configured to hold a grating disk for determining the position or orientation of the radar element 410. The rotating radar 195 may include a main frame 430 for supporting the grating assembly 428. The rotating radar 195 may include a supporting bracket 435 coupled with the main frame 430. The rotating radar 195 may include a Hall magnet supporting frame 440 configured to support a Hall magnet. The rotating radar 195 may include an electrical control board 445. The electrical control board 445 may include various circuits, devices, electrical elements to control the operation of the rotating radar 195. The rotating radar 195 may include a communication device 450 configured to communicate with an external device. The rotating radar 195 may include a waterproof silicone seal 455. The rotating radar 195 may include a back cover 460.

Figure 5:
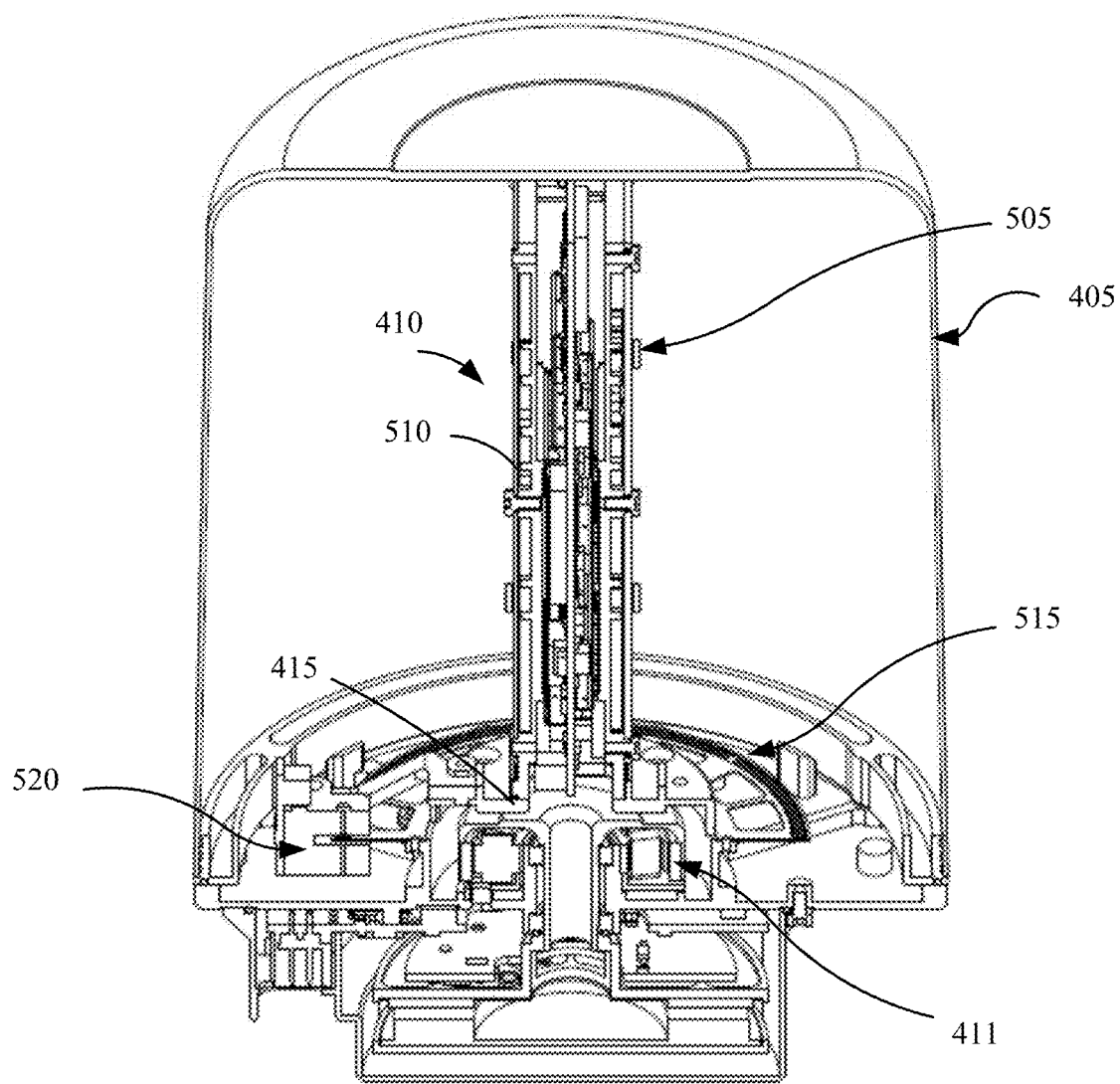
FIG. 5 is a cut-away view of an inside structure of the rotating radar, in accordance with an embodiment of the present disclosure.

FIG. 5 is a cut-away view of an inside structure of the rotating radar 195. The radar element 410 may include one or more radar antennas 505 mounted on a supporting frame 510. At least one of the antennas 505 may function as an emitter, and at least one of the antennas 505 may function as a receiver. The supporting frame 510 may be mounted on the motor plate 415, which is part of the electric motor 411. The electric motor 411 may cause the motor plate 415 to rotate. The supporting frame 510 may rotate along with the motor plate 415 to position the radar antennas 505 to face different directions. When the radar antennas 505 rotate to face a specified direction, the emitter may emit the radar wave in the specified direction. In some embodiments, the radar wave may have a lobe having a spanning angle (e.g., 9 degrees) around the specified direction. The spanning angle of the lobe indicate the size of the space the radar wave scans in the specified direction.

The grating assembly 428 may include a grating disk 515 and an opto-electrical sensor 520. The grating disk 515 may be coupled to the motor plate 415, and may rotate along with the motor plate 415 and the supporting frame 510 of the radar element 410. A portion of the grating disk 515 may be disposed in a narrow space between a light emitter and a light receiver of the opto-electrical sensor 520. The opto-electrical sensor 520 may determine the position or orientation of the radar element 410 based on the portion of the grating disk 515 disposed in the narrow space of the opto-electrical sensor 520.

Figure 6:
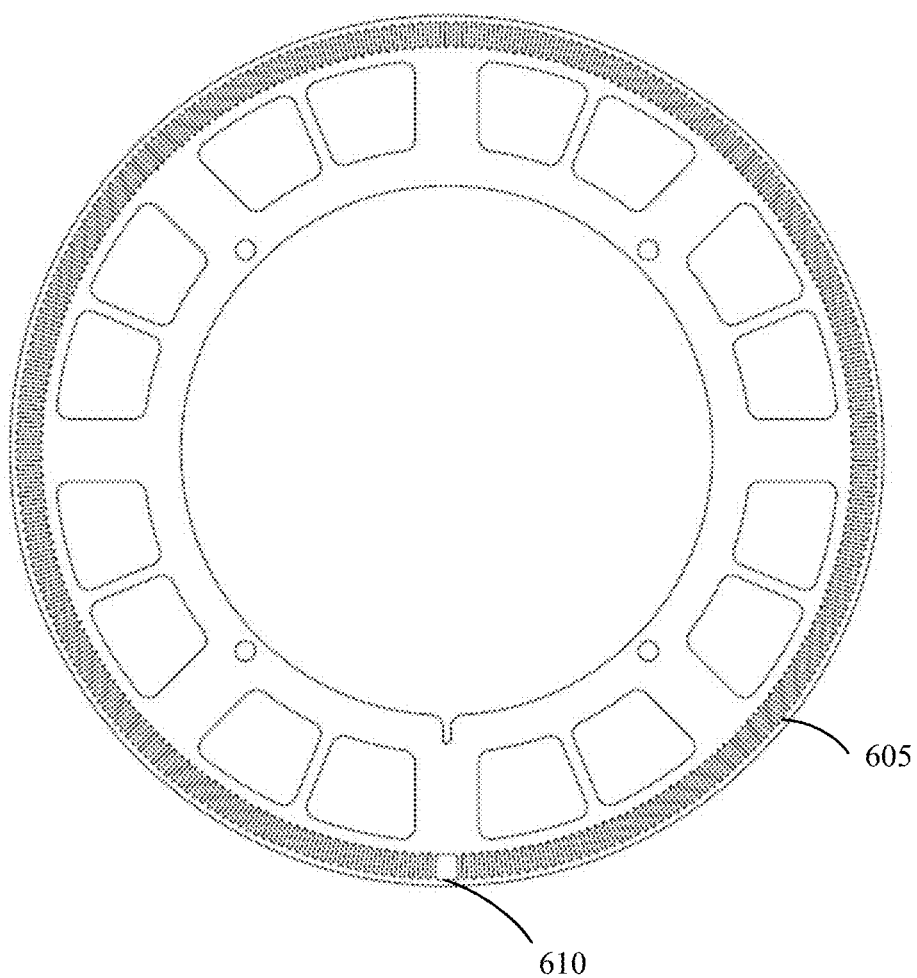
FIG. 6 is a grating disk of the rotating radar, in accordance with an embodiment of the present disclosure.

FIG. 6 shows an example grating disk 515. The grating disk 515 includes a plurality of scales 605 separated by a plurality of hollow slots distributed along the circumference. In some embodiments, the grating disk 515 may include 600 scales corresponding to 360 degrees. In other embodiments, it is possible to include other suitable number of scales. Reference numeral 610 indicates an initial position (e.g., a position corresponding to 0 degree).

Figure 7:
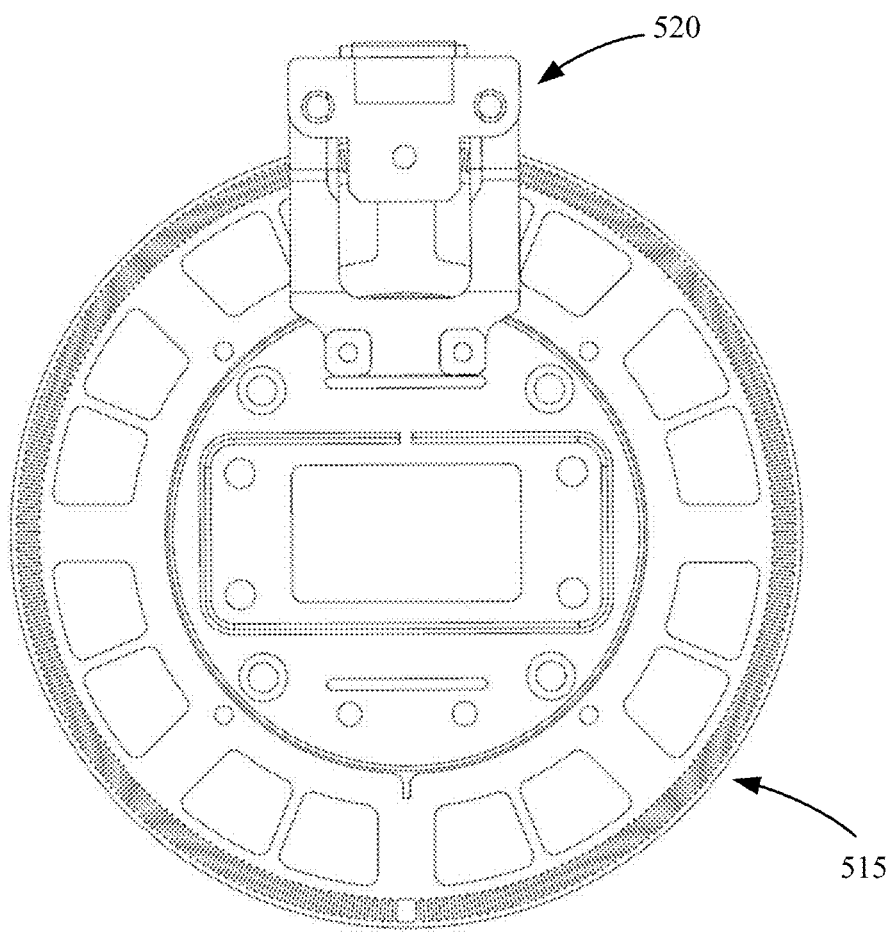
FIG. 7 is a bottom view of a grating disk and an optoelectrical sensor of the rotating radar, in accordance with an embodiment of the present disclosure.

FIG. 7 is a bottom view of the grating disk 515 and the opto-electrical sensor 520. The opto-electrical sensor 520 may emit a light from a light emitter, which may be received by a light receiver disposed opposite the light emitter. There may be a narrow space or gap between the light emitter and the light receiver. When the grating disk 515 rotates to position a scale in the gap, thereby in the travel path of the light, the scale may change the property of the light received at the light receiver. In some embodiment, the property change of the light at the receiver side may trigger an emission of a radar wave by the radar element 410 to scan an area in a direction corresponding to the degree of the scale.

Figure 8:
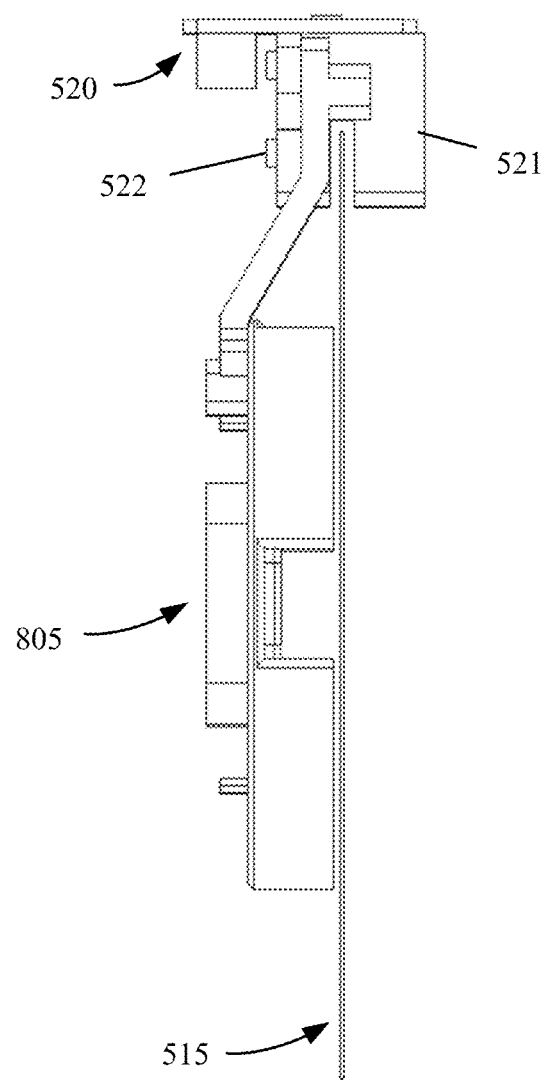
FIG. 8 is a side view of a structure including the optoelectrical sensor and the grating disk, in accordance with an embodiment of the present disclosure.

FIG. 8 is a side view of a structure including the grating disk 515 and the opto-electrical sensor 520. As shown in FIG. 8, the grating disk 515 may be supported by a base 805. As the grating disk 515 rotates, a portion of the grating disk 515 is disposed in a narrow space between a first portion 521 and a second portion 522 of the opto-electrical sensor 520. A light emitter and a light receiver may be disposed at the first portion 521 and the second portion 522, respectively. A person having ordinary skill in the art can appreciate the operation principle of the combination of the grating disk 515 and the opto-electrical sensor 520. Thus, detailed descriptions of the operation principles of the grating disk 515 and the opto-electrical sensor 520.

Figure 9:
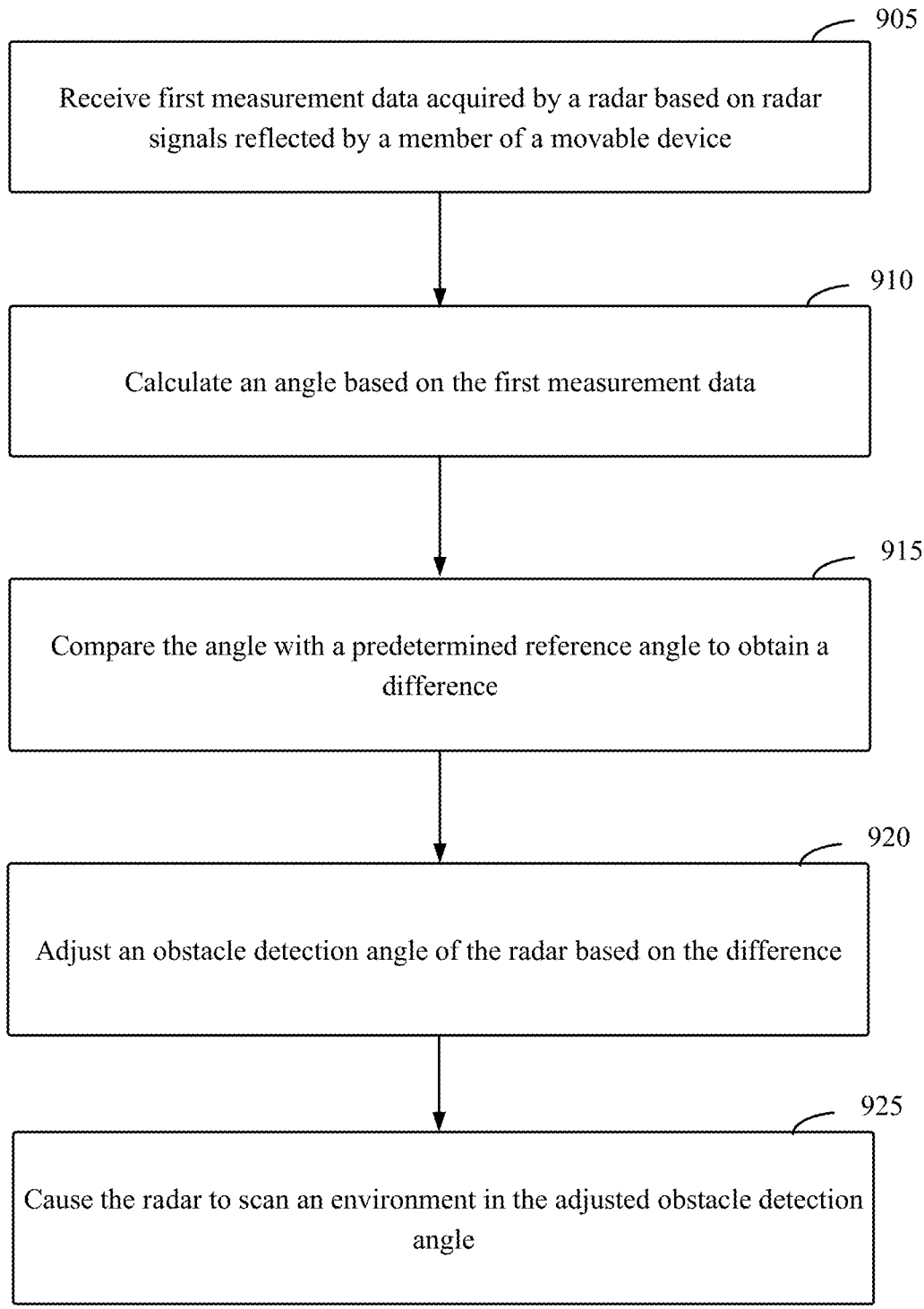
FIG. 9 is a flow chart illustrating a method of detecting radar wave offset, in accordance with an embodiment of the present disclosure.

FIG. 9 is a flow chart illustrating a method for detecting a radar wave offset and/or for compensating for (or correcting) the offset. In some embodiments, method 900 may be performed by a processor or controller included in the UAV 100. For example, the method 900 may be performed by a processor included in the flight control device 220 (which may also be referred to as a controller 220). In some embodiments, the method 900 may be performed by the rotating radar 195, such as a processor or controller included in rotating radar 195. In some embodiments, the method 900 may be performed by a remote control device communicatively coupled with the UAV 100 and configured to control the flight and other operations of the UAV 100. The method 900 may be executed to detect and/or correct the radar wave offset caused by deviations in the mounting position and/or orientation of the rotating radar 195, which may be caused by improper mounting and/or vibrations.

For example, during operation, the position and/or orientation of the rotating radar 195 may drift or deviate from the original mounting position and/or orientation, which may cause a radar wave offset. The radar wave offset refers to a difference in a direction (or angle) a radar wave is supposed to be emitted for detecting an object and the actual direction (or angle) the radar wave is emitted for detecting an object. In some embodiments, when the rotating radar 195 is initially mounted to the UAV 100, the orientation and position of the rotating radar 195 may be calibrated such that when the radar element 410 is rotated to face a front (or moving) direction of the UAV 100 in the horizontal plane, the orientation of the radar element 410 corresponds to 0 degree of the grating disk 515. After the rotating radar 195 has been used for a while, the mounting of the rotating radar 195 may become lose, causing the position and/or the orientation of the rotating radar 195 to deviate from the calibrated position and/or orientation. In some situations, the rotating radar 195 may be disassembled from the UAV 100 (e.g., for service) and reinstalled onto the UAV 100, the mounting position and/or orientation of the rotating radar 195 may be different from those of the rotating radar 195 when the rotating radar 195 is first installed and calibrated. As a result, an error may exist in the correspondence relationship between a desired radar wave emitting direction and the degrees indicated by the scales on the grating disk 515. For example, after calibration, the horizontal front direction shown in FIG. 1 may correspond to 0 degree on the grating disk 515. When the rotating radar 195 is disassembled from the UAV 100 and then reinstalled onto the UAV 100, the 0 degree on the grating disk 515 may not correspond to the horizontal front direction of the UAV 100. Instead, the 5 degree scale on the grating disk 515 may correspond to the horizontal front direction of the UAV 100. When this occurs, there is a 5 degree deviation or offset in the direction of the radar wave.

The disclosed methods may detect the offset in the radar wave by comparing acquired radar signal or data with previously acquired radar signal or data when the rotating radar 195 is calibrated. A parameter may be derived from each set of radar signal or data. The parameters may be compared with one another to determine whether there is a radar wave offset due to, e.g., an error caused by the deviation in the mounting position and/or orientation of the rotating radar 195. When there is a radar wave offset, the disclosed methods may compensate for or correct the radar wave offset by adjusting an obstacle detection angle.

Method 900 may include receiving first measurement data acquired by a radar based on radar signals reflected by a member of a movable device (step 905). In some embodiments, the movable device may be the UAV 100, and the member may include one or more arms or branches of the arms of the UAV 100. In some embodiments, the member may include other fixed structural components of the UAV 100. For example, as shown in FIG. 1, the rotating radar 195 is mounted to a supporting leg 185. Without considering other factors, such as deformation of the supporting leg 185, the relative position (or distance) between the arms of the UAV 100 and the rotating radar 195 is fixed. When rotating radar 195 rotates to scan the environment in 360 degrees, the radar wave may be reflected back by at least some of the arms of the UAV 100, such as the arms 101 and 102 shown in FIG. 1. When the position and/or orientation of the rotating radar 195 has not been changed due to, e.g., improper mounting, the measurement data acquired by the rotating radar 195 based on the radar signals reflected back by the arms do not change (or do not have significant changes). When the position and/or orientation of the rotating radar 195 has been changed due to, e.g., improper mounting of the rotating radar 195, the relative position (or distance) between the arms of the UAV 100 and the rotating radar 195 has been changed. Thus, when the same radar signals are reflected back from the arms, the measurement data obtained prior to the position and/or orientation change in the rotating radar 195 may be different from the measurement data obtained after the position and/or orientation change in the rotating radar 195. In some embodiments, after the rotating radar 195 has deviated or shifted from its original, calibrated mounting position and/or orientation, the rotating radar 195 may generate first measurement data based on radar signals reflected back by some of the arms. In some embodiments, the flight control device 220 may receive the first measurement data from the rotating radar 195.

Method 900 may include calculating an angle based on the first measurement data (step 910). A property or parameter may be determined based on the first measurement data. The property or parameter may include a slope or angle determined by a curve fitting of the first measurement data using a linear regression model. In some embodiments, the flight control device 220 may calculate the slope or angle based on the first measurement data.

Method 900 may include comparing the angle with a predetermined reference angle to obtain a difference (step 915). In some embodiments, the predetermined reference angle may be the angle determined by a linear fitting of previously acquired measurement data when the rotating radar 195 is mounted and calibrated (i.e., when there is no radar wave offset). For example, after the rotating radar 195 is mounted and calibrated, the rotating radar 195 may acquire measurement data based on signals reflected back by some of the arms (same arms as those associated with generating the first measurement data). In some embodiments, a linear fitting may be applied to the measurement data to determine a slope or angle, which may be used as the predetermined reference angle. When improper mounting or other reasons cause a radar wave offset in the rotating radar 195, the angle determined based on the first measurement data may be different from the predetermined reference angle determined when the rotating radar 195 is calibrated.

Comparing the angle calculated based on the first measurement data acquired when the rotating radar 195 has a radar wave offset caused by, e.g., improper mounting, with the predetermined reference angle produces a difference in the angles. Method 900 may include adjusting an obstacle detection angle of the radar based on the difference (step 920). For example, when the difference is small (e.g., smaller than a threshold value), the obstacle detection angle of the rotating radar 195 may not need adjustment. When the difference is greater than a predetermine threshold value (e.g., 4 degrees), the obstacle detection angle of the rotating radar 195 may be adjusted based on the difference. For example, when the obstacle detection angle is 0 degree corresponding to the horizontal front direction of the UAV 100 (e.g., the moving direction in the horizontal plane), and when the difference between the angle calculated based on the first measurement data and the predetermined reference angle is 10 degrees, the obstacle detection angle may be adjusted by 10 degrees. In some embodiments, the radar element 410 may be rotated by 10 degrees from its 0 degree position to a 10 degree position, and the radar element 410 may face the new direction to emit radar waves.

Method 900 may include causing the radar to scan an environment in the adjusted obstacle detection angle (step 925). For example, the rotating radar 195 may scan the environment surrounding the UAV 100 in the adjusted obstacle detection angle, e.g., in the 10 degree direction instead of the 0 degree direction.

An example of method 900 will be described below with reference to FIGS. 10A, 10B, 11A, 11B, 12, and 13. FIG. 10A illustrates a side view of the UAV 100 in a state when a pitch angle is 0 degree (e.g., horizontally stable state). FIG. 10B illustrates a side view of the UAV 100 in a state when a pitch angle is non-zero (e.g., a horizontally tilted state). Here, the obstacle detection angle can be assumed to be 0 degree. Thus, the obstacle detection direction is the horizontal front direction (or the moving direction in the horizontal plane), i.e., the roll axis direction shown in FIG. 10A. FIG. 10A can be used to represent a situation where the rotating radar 195 has been calibrated, and the roll axis direction (or horizontal front direction) corresponds to the 0 degree scale on the grating disk 515. When there is a non-zero pitch angle β in the attitude of the UAV 100, as shown in FIG. 10B (e.g., when the Yaw axis is tilted for an angle β), it is equivalent to a situation where the UAV 100 has a zero pitch angle, but the 0 degree on the grating disk 515 has been rotated for β degrees due to improper mounting of the rotating radar 195. Thus, FIG. 10B can be used to represent a situation where the rotating radar 195 has a radar wave offset of β degrees, which may be caused by improper mounting or installation of the rotating radar 195 or be caused by vibrations or impact during landing.

Figure 11B:
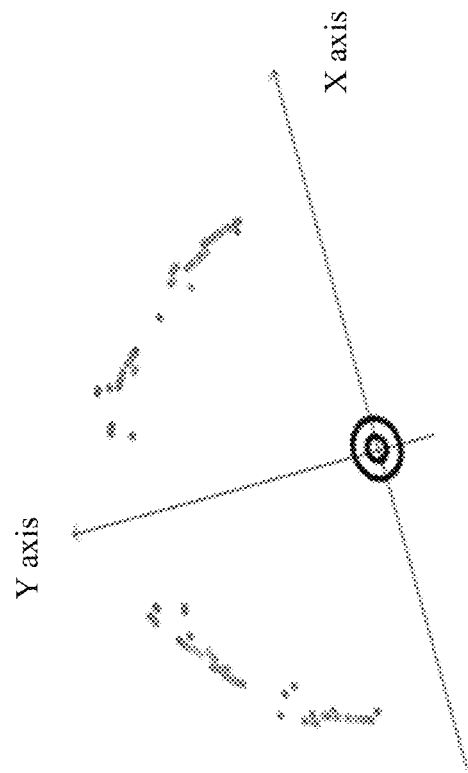
FIG. 11B illustrates a plot of measurement data acquired by the based on radar signals reflected back by the same arms of the UAV, when there is a radar wave offset, in accordance with an embodiment of the present disclosure.
Figure 11A:
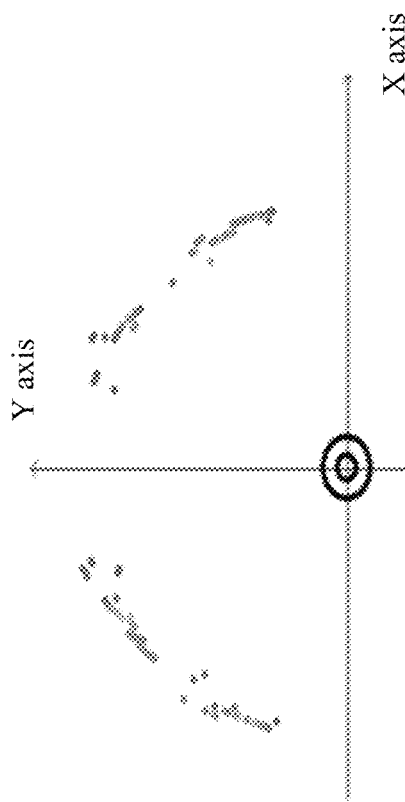
FIG. 11A illustrates a plot of measurement data acquired by the rotating radar based on radar signals reflected back by certain arms of the UAV, when the rotating radar is calibrated, in accordance with an embodiment of the present disclosure.

FIG. 11A illustrates a plot of measurement data acquired by the rotating radar 195 based on radar signals reflected back by certain arms of the UAV 100, when the rotating radar 195 is calibrated (e.g., when there is no radar wave offset), corresponding to the situation shown in FIG. 10A. FIG. 11B illustrates a plot of measurement data acquired by the rotating radar 195 based on radar signals reflected back by the same arms of the UAV 100, when there is some error in the mounting position and/or orientation of the rotating radar 195, which may have caused a specified obstacle detection angle (or direction) to have been rotated for β degrees (e.g., which may have caused a radar wave offset), corresponding to the situation shown in FIG. 10B.

Figure 12:
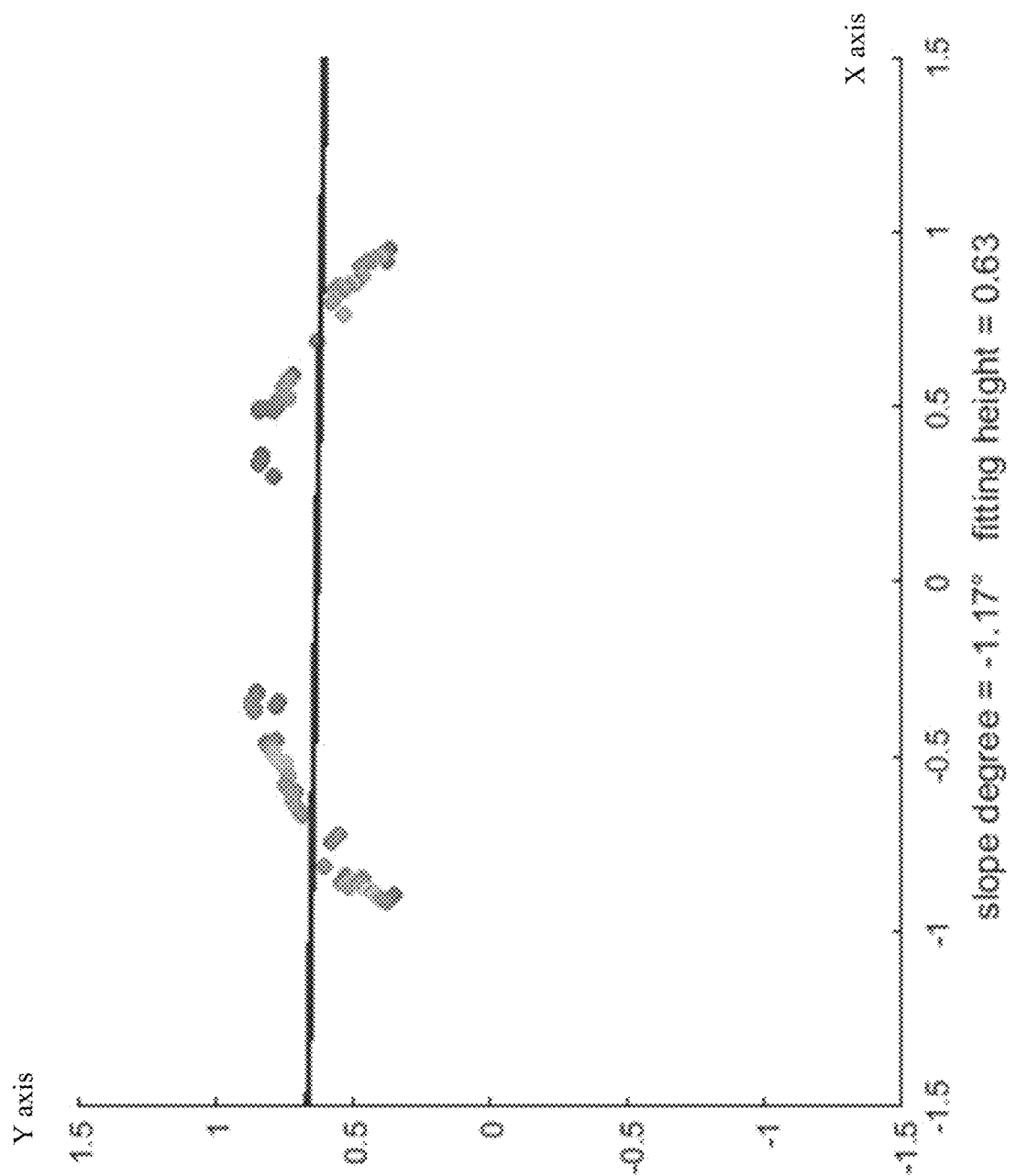
FIG. 12 illustrates curve fitting of the measurement data acquired by the rotating radar when the rotating radar is calibrated, in accordance with an embodiment of the present disclosure.

FIG. 12 illustrates curve fitting of the measurement data plotted in FIG. 11A, which are acquired by the rotating radar 195 when the rotating radar 195 is calibrated (e.g., when there is no radar wave offset). That is, FIG. 12 shows curve fitting of the measurement data plotted in FIG. 11A. Any suitable linear regression model may be applied to fit the measurement data. In the example shown in FIG. 12, a first degree polynomial model may be used to fit the measurement data. A slope or angle of the linear fitting line may be calculated to be −1.17°, which is substantially 0°. The −1.17° angle may be used as the reference angle. A person having ordinary skill in the art can appreciate that the reference angle does not need be 0° or close to 0°. In other words, the reference situation of the UAV 100 for determining a reference angle does not need be a horizontally stable state as shown in FIG. 10A.

Figure 13:
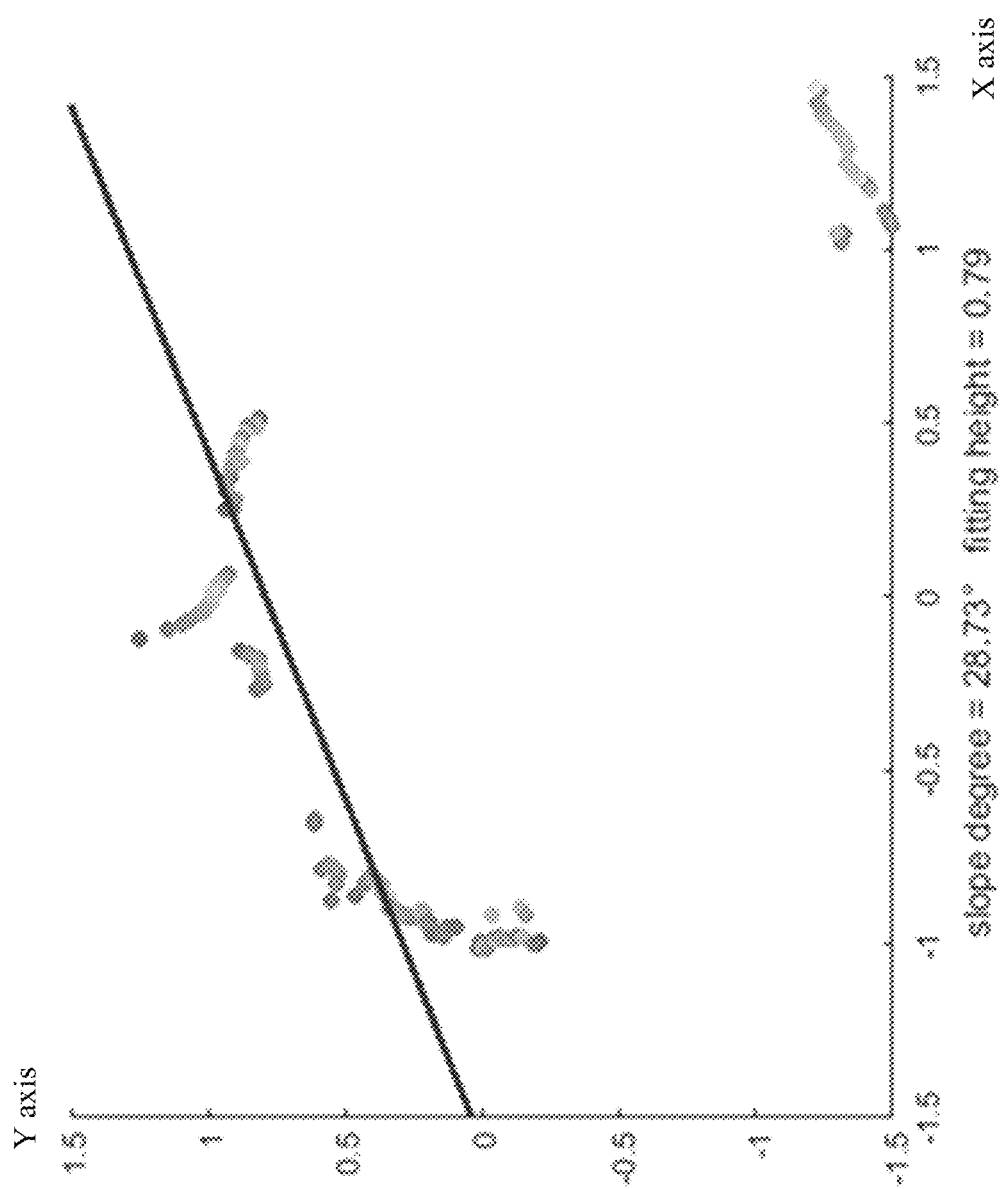
FIG. 13 illustrates curve fitting of measurement data acquired by the rotating radar when there is a radar wave offset, in accordance with an embodiment of the present disclosure.

FIG. 13 illustrates curve fitting of measurement data plotted in FIG. 11B, which are acquired by the rotating radar 195 when there is a radar wave offset. The measurement data may be fitted with a linear fitting line. A slope or angle of the linear fitting line may be calculated to be 28.73°, which is different from the reference slope or angle of −1.17° when the rotating radar 195 is calibrated. The difference between the angle of 28.73° and the angle of −1.17° is 29.9°, which is approximately 30°. This indicate that in the situation shown in FIG. 10B, there is a radar wave offset of about 30°.

In some embodiments, before fitting the measurement data, the measurement data of the rotating radar 195 may be converted into coordinates of a coordinate system. The measurement data may represent distance data between the rotating radar 195 and the arms of the UAV 100 that reflected back the radar signals. The distance data may be denoted as L. The distance data may be converted into coordinates in an X-Y Cartesian coordinate system, shown in FIG. 10B, which uses a rotation center of the rotating radar 195 as an origin, a horizontal direction (e.g., flight direction or moving direction) as an X axis, and a downward pointing direction as a Y axis. In some embodiments, the distance data acquired by the rotating radar 195 may be converted into coordinates in the X-Y Cartesian coordinate system using the following equations:

$$Xi = L * \mathrm{Sin}((G0 - Gi)/Z)$$

$$Yi = L * \mathrm{Cos}((G0 - Gi)/Z),$$

where G0 represents the scale of the grating disk corresponding to 0 degree, and Z is the angle value (degrees) corresponding to a scale of the grating disk 515 for an $i^{th}$ scale Gi.

As discussed above, any suitable linear regression model may be used to fit the measurement data (now represented by Xi and Yi in the X-Y Cartesian coordinate system). The following equations may be used to calculate the parameters k and b in a first degree polynomial curve fitting equation: y=k*x+b, where $$k = \frac{n\sum x_i y_i - \sum x_i \sum y_i}{n\sum x_i^2 - \left(\sum x_i\right)^2}$$

$$b = \frac{\sum x_i^2 \sum y_i - \sum x_i \sum x_i y_i}{n\sum x_i^2 - \left(\sum x_i\right)^2}$$

The angle or slope of an arm relative to the mounting position of the rotating radar 195 can be determined by arctan (k), where function arctan( ) is the inverse trigonometric function.

The above method may be applied to the measurement data acquired by the rotating radar 195 when the rotating radar 195 is calibrated after installation, and the measurement data acquired when the rotating radar 195 has been in service for a period of time or has been disassembled and mounted back to the UAV 100, in which cases there may be a deviation in the position and/or orientation of the rotating radar 195 (hence there may be an offset in the radar wave). A reference angle may be determined based on the measurement data when the rotating radar 195 is calibrated. The reference angle may be saved or stored in a memory. A first angle may be determined based on the measurement data when the rotating radar 195 has an offset in the radar wave. The first angle may be compared with the reference angle. If the difference is greater than a predetermined threshold difference, it may indicate that there is a radar wave offset that needs to be compensated for or corrected. To compensate for the radar wave offset, in some embodiment, the rotating radar 195 may be adjusted. The obstacle detection angle (e.g., the desired scanning direction of the radar element 410) may be adjusted based on the difference. For example, if the difference is 5 degrees, and if the obstacle detection angle is the horizontal front direction corresponding to the 0 degree in the grating disk 515, the obstacle detection angle may be adjusted by 5 degrees. In some embodiments, the radar element 410 may be physically rotated by 5 degrees (clockwise or counter-clockwise) to reach a new position (or facing direction of the radar element 410) that corresponds to the 5 degrees scale on the grating disk 515. The 5 degrees scale may correspond to the adjusted obstacle detection angle. The rotating radar 195 may scan the environment in the adjusted obstacle detection angle. For example, the rotating radar 195 may scan in the 5 degree direction instead of the original 0 degree direction to detect obstacles.

In some embodiments, instead of physically adjusting the obstacle detection angle of the radar element 410 based on the difference (e.g., instead of rotating the radar element 410 by 5 degrees and using that new position as the obstacle detection angle), other methods may be used to compensate for the radar wave offset. For example, the radar wave offset may be considered when selecting the measurement data for analysis to detect an obstacle. Measurement data corresponding to the adjusted angle on the grating disk 515 may be selected for analysis to detect obstacles. For example, measurement data corresponding to 5 degrees may be selected instead of measurement data corresponding to 0 degree. An embodiment of this method is shown in FIG. 14.

FIG. 14 is a flow chart illustrating a method 1400 for detecting a radar wave offset and/or for compensating for (or correcting) the offset. In some embodiments, method 1400 may be performed by a processor or controller included in the UAV 100. For example, the method 1400 may be performed by a processor included in the flight control device 220 (which may also be referred to as a controller 220). In some embodiments, the method 1400 may be performed by the rotating radar 195, such as a processor or controller included in rotating radar 195. In some embodiments, the method 1400 may be performed by a remote control device communicatively coupled with the UAV 100 and configured to control the flight and other operations of the UAV 100. The method 1400 may be executed to detect and/or correct the radar wave offset caused by changes in the mounting or installation position and/or orientation of the rotating radar 195.

Method 1400 may include receiving first measurement data acquired by a radar based on radar signals reflected by a member of a movable device (step 1405), calculating an angle based on the first measurement data (step 1410), and comparing the angle with a predetermined reference angle to obtain a difference (step 1415). These steps are substantially the same as steps 905-915 shown in FIG. 9. Thus, the descriptions of these steps may refer to the above descriptions of step 905, 910, and 915.

Method 1400 may include determining an adjusted obstacle detection angle of the radar based on a specified obstacle detection angle and the difference (step 1420). For example, if a specified obstacle detection angle is 0 degree on the grating disk 515 (e.g., corresponding to the horizontal front direction), the specified obstacle detection angle may be combined with the difference to produce an adjusted obstacle detection angle. For example, the adjusted obstacle detection angle may be 5 degrees when the difference is 5 degrees. Thus, the adjusted obstacle detection angle may correspond to the 5-degree scale on the grating disk 515. Instead of physically adjusting the facing direction (e.g., the angle on the grating disk 515) of the radar element 410, method 1400 may include selecting second measurement data relating to an environment acquired by the radar corresponding to the adjusted obstacle detection angle (step 1425). As the rotating radar 195 rotates 360 degrees and scans the environment, measurement data for the 360 degrees may be obtained. If the original obstacle detection angle is 0 degree, and the adjusted obstacle detection angle is 5 degrees, the method 1400 may include selecting the second measurement data corresponding to the 5 degree adjusted obstacle detection angle, and use the selected for analysis to detect an obstacle.

Method 1400 may include determining whether there is an obstacle in the specified obstacle detection angle based on the second measurement data (step 1430). For example, a processor or controller may analyze the selected second measurement data corresponding to the 5 degrees direction or angle and determine whether there is an obstacle in that direction. The 5 degrees direction is the actual obstacle detection direction that deviated from the 0 degree original, specified obstacle detection angle due to the radar wave offset caused by, e.g., improper mounting of the rotating radar 195.

Thus, as shown in the methods illustrated in FIGS. 9 and 14, there are two different methods to compensate for the radar wave offset. A first method is to physically adjust the direction in which the radar element 410 faces (or physically adjust the obstacle detection angle) when acquiring measurement data for obstacle detection. A second method is to continuously scan the environment while the rotating radar 195 rotates 360 degrees. When selecting data for the desired obstacle detection direction (or angle), the measurement data corresponding to an adjusted obstacle detection angle (combining the original, specified obstacle detection angle with the angle difference corresponding to the radar wave offset) may be selected as the measurement data for analysis to detect obstacles.

Aside from improper mounting, other factors may also cause the radar wave offset. The UAV 100 may include attitude sensors, such as inertial measurement unit ("IMU"), global positioning system ("GPS") sensor, and compass, to measure the attitude information of the UAV 100. The attitude information may include at least one of a pitch angle, a roll angle, and a yaw angle. The rotating radar 195 may use the attitude information to adjust its obstacle detection angle. Due to various reasons, such as temperature and/or humidity changes, the attitude sensors may generate errors in the measurement data relating to the attitude information acquired by the attitude sensors. For example, the IMU may measure a pitch angle of 30 degrees, which may have a 5 degree error compared to the actual pitch angle. The disclosed method may detect the error in the measurement data output by the IMU. The obstacle detection angle of the rotating radar 195 may be adjusted based on the detected difference in the pitch angle (or any other attitude information). Although the IMU and the pitch angle are used for illustrating the related methods, other attitude sensors and other attitude information (e.g., the roll angle and/or the yaw angle) may be used in combination with or as alternatives to the IMU and the pitch angle.

FIG. 15 is a flow chart illustrating a method 1500 for detecting a radar wave offset and/or for compensating for (or correcting) the offset. In some embodiments, method 1500 may be performed by a processor or controller included in the UAV 100. For example, the method 1500 may be performed by a processor included in the flight control device 220 (which may also be referred to as a controller 220). In some embodiments, the method 1500 may be performed by the rotating radar 195, such as a processor or controller included in rotating radar 195. In some embodiments, the method 1500 may be performed by a remote control device communicatively coupled with the UAV 100 and configured to control the flight and other operations of the UAV 100. The method 1500 may be executed to detect and/or correct the radar wave offset caused by errors in the IMU.

Method 1500 may include obtaining measurement data relating to an attitude of the unmanned aerial vehicle from one or more attitude sensors when the unmanned aerial vehicle hovers in a horizontally stable state (step 1505). For the example, attitude sensors, such as IMU, GPS, and compass, may output measurement data (represented by $q_1$, $q_2$, $q_3$, and $q_4$) relating to the attitude of the UAV 100 to a processor or controller (which may be included in the flight control device 220 or the rotating radar 195). The processor or controller may calculate the attitude angles (e.g., roll angle $\alpha$, pitch angle $\beta$, and yaw angle $\gamma$) based on the data using the following equations:

$$\begin{pmatrix} \alpha \\ \beta \\ \gamma \end{pmatrix} = \begin{bmatrix} a\tan2(2(q_0q_1 + q_2q_3), 1 - 2(q_1^2 + q_2^2)) \\ a\sin(2(q_0q_2 - q_1q_3)) \\ a\tan2(2(q_0q_3 + q_1q_2), 1 - 2(q_2^2 + q_3^2)) \end{bmatrix}.$$

In some embodiments, the measurement data may also include velocity information. The velocity of the UAV 100 may be represented by $[v_x, v_y, v_z]=F(y1, y2, \ldots, yn)$, where $v_x$ is the speed in an x direction (e.g., a speed in the horizontal moving direction), $v_y$ is the speed in a y direction (e.g., a speed in the horizontal lateral direction), $v_z$ is the speed in a vertical direction, and yi is data from the $i^{th}$ attitude sensor. The magnitude of the velocity of the UAV 100 may be represented by $V=\sqrt{v_x^2+v_y^2+v_z^2}$. The processor or controller may determine whether the UAV 100 is hovering in a horizontally stable state based on monitoring the magnitude of the velocity V. For example, when the processor detects that at time instance t0, V is smaller than or equal to a predetermined velocity value $V_{th}$, the processor may start monitoring the value V in the next period of time T at a plurality of predetermined time instances. If the values of V measured at the time instances within the period of time T are all smaller than or equal to $V_{th}$, the processor may determine that the UAV 100 is hovering in a horizontally stable state, and may save the attitude information output from the attitude sensors for later use when assessing errors in the measurement data output from the attitude sensors. If within the period of time T, the values of the monitored V are greater than the $V_{th}$ in a continuous period of time T0 (T0<T), then the processor may determine that the UAV 100 is not hovering in a horizontally stable state, and may not save the attitude information output from the attitude sensors. The processor may restart the process of monitoring the values of V and repeat the above process for determining whether the UAV 100 is hovering in a horizontally stable state.

Method 1500 may include calculating an average value of a parameter relating to the attitude based on the measurement data (step 1510). For example, based on determination that the UAV 100 is hovering in a horizontally stable state, the processor may calculate an average value of the pitch angle β based on the saved attitude information. The processor may first calculate the pitch angle βi based on the $i^{th}$ saved attitude data that are obtained within the period of time T, and then calculate the average value of the pitch angle β using the following equation:

$$\overline{\beta_k} = \frac{1}{n} * \sum_{i=1}^{n} \beta_i$$

Method 1500 may include comparing the average value of the parameter with a first predetermined threshold (step 1515). For example, the processor may compare the average pitch angle $\overline{\beta_k}$ with a first predetermined threshold $\beta_1$. The first predetermined threshold $\beta_1$ may be a maximum allowable variation of the pitch angle when the UAV 100 is hovering in a horizontally stable state. If the average pitch angle $\overline{\beta_k}$ is smaller than or equal to the first predetermined threshold $\beta_1$, the processor may determine that there is no error in the measurement data output from the attitude sensors. If the average pitch angle $\overline{\beta_k}$ is greater than the first predetermined threshold $\beta_1$, the processor may determine that there is an error in the measurement data output from the attitude sensors.

Method 1500 may include comparing the average value of the parameter with a stored average value of the parameter to obtain a difference when the average value of the parameter is greater than the first predetermined threshold (step 1520). If the average pitch angle $\overline{\beta_k}$ is greater than the first predetermined threshold $\beta_1$, the processor may determine that there is an error in the measurement data output from the attitude sensors. The processor may compare the average pitch angle $\overline{\beta_k}$ with a previously determined average pitch angle $\overline{\beta_{k-1}}$, using the following equation to obtain a difference in the average pitch angles: $\Delta\beta = |\overline{\beta_k} - \overline{\beta_{k-1}}|$. The previously determined average pitch angle $\overline{\beta_{k-1}}$ may be determined in the last assessment of whether there is an error in the measurement data output by the attitude sensors, and may be previously stored in a memory.

Method 1500 may include comparing the difference with a second predetermined threshold and a third predetermined threshold (step 1525). The second predetermined threshold may be represented by $\beta_2$, and the third predetermined threshold may be represented by $\beta_3$. If the difference in the average pitch angles $\Delta\beta$ is smaller than or equal to the second predetermined threshold $\beta_2$, the processor may determine that the error in the measurement data output from the attitude sensors does not need to be corrected. If the difference in the average pitch angles $\Delta\beta$ is greater than the second predetermined threshold $\beta_2$, but smaller than or equal to the third predetermined threshold $\beta_3$, the processor may determine that the error in the measurement data output from the attitude sensors needs to be corrected. Thus, the method 1500 may include calculating an angle offset based on the difference when the difference is greater than the second predetermined threshold and smaller than or equal to the third predetermined threshold (step 1530). For example, the processor may calculate an angle offset (e.g., an obstacle detection angle offset) based on the following equation:

$$\beta_{offset} = -\frac{\Delta\beta}{2\pi} * N,$$

where the number N is the total number of scales on the grating disk 515, which may be any suitable number. In some embodiments, N may be 600, 500, 400, etc.

Method 1500 may include adjusting an obstacle detection angle of a radar based on the angle offset (step 1535). In some embodiments, the processor may physically adjust the obstacle detection angle of the radar element 410, such that the radar element 410 faces a new angle as compared to its original, specified obstacle detection angle. The new angle may be a combination of the original, specified obstacle detection angle and the angle offset calculated above. For example, the processor may cause the radar element 410 to rotate to the new angle and scan the environment from the new angle to detect potential obstacles in the environment.

When the difference in the average pitch angles $\Delta\beta$ is greater than the third predetermined threshold $\beta_3$, the processor may provide an alert message to a user of the UAV 100 to instruct the user to manually calibrate the attitude sensors. This is because the UAV 100 may have been influenced by various external factors that may have caused significant deviations or errors in the measurement data output from the attitude sensors. When a user performs a manual calibration of the attitude sensors, the user may place the UAV 100 on a horizontal ground or floor, or may control the UAV 100 to hover in a horizontally stable state at a certain height in an environment where wind effect is small (or there is no wind effect). The processor may acquire measurement data relating to the attitude of the UAV 100 within a predetermined period of time T, and calculate the average pitch angle $\overline{\beta_k}$ based on the measurement data obtained within the period of time T, as described above. The processor may calculate the difference $\Delta\beta = |\overline{\beta_k} - \overline{\beta_{k-1}}|$, and the user may manually adjust the obstacle detection angle based on the difference $\Delta\beta$. For example, the user may manually rotate the radar element 410 to an angle on the grating disk 515 equaling to a combination of an original, specified obstacle detection angle and $\Delta\beta$. After the calibration is performed, the value of $\overline{\beta_k}$ may be stored in the memory for use in the next assessment of whether there is an error in the measurement data output from the attitude sensors. For the next assessment, $\overline{\beta_k}$ will replace $\overline{\beta_{k-1}}$ in the above equations.

Figure 16:
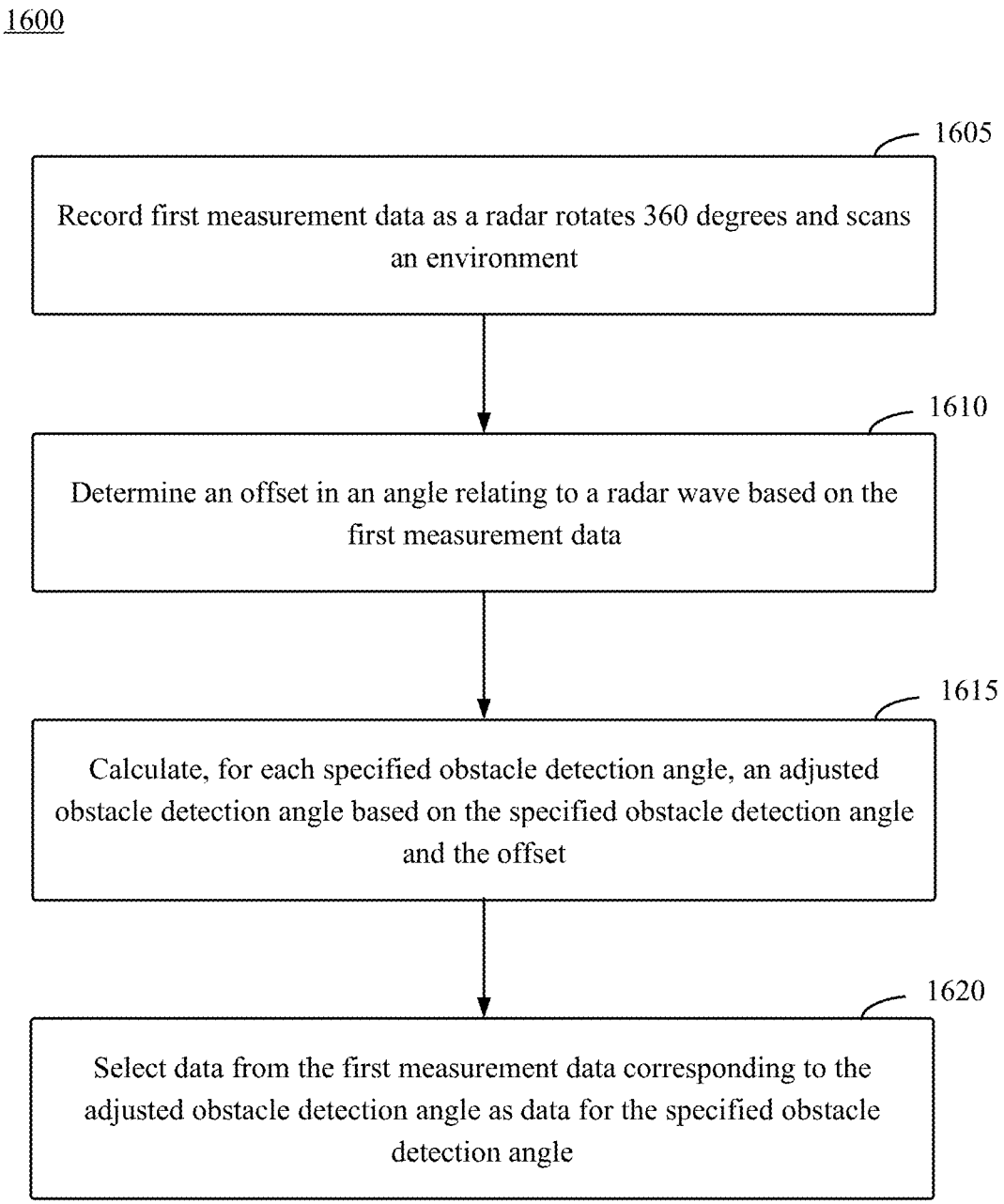
FIG. 16 is a flow chart illustrating a method for detecting a radar wave offset, in accordance with another embodiment of the present disclosure.

FIG. 16 is a flow chart illustrating a method for detecting a radar wave offset and/or for compensating for (or correcting) the offset. In some embodiments, method 1600 may be performed by a processor or controller included in the UAV 100. For example, the method 1600 may be performed by a processor included in the flight control device 220 (which may also be referred to as a controller 220). In some embodiments, the method 1600 may be performed by the rotating radar 195, such as a processor or controller included in rotating radar 195. In some embodiments, the method 1600 may be performed by a remote control device communicatively coupled with the UAV 100 and configured to control the flight and other operations of the UAV 100. The method 1600 may be executed to detect and/or correct the radar wave offset caused by deviations in the position and/or orientation of the rotating radar 195 due to improper mounting or vibration. The method 1600 may also be executed to detect and/or correct the radar wave offset caused by any other reasons, such as errors in the measurement data output from the attitude sensors.

Method 1600 may include recording first measurement data as a radar rotates 360 degrees and scans an environment (step 1605). For example, the rotating radar 195 may rotate 360 degrees and continuously record measurement data at every degree in 0-360 degrees. In some embodiments, the first measurement data may be acquired by the rotating radar 195 based on radar signals reflected back by some arms of the UAV 100, and may include distance data reflecting the distance between the arms of the UAV 100 and the rotating radar 195. Example measurement data are shown in FIG. 11B.

Method 1600 may also include determining an offset in an angle relating to a radar wave based on the first measurement data (step 1610). Any of the above-described methods may be used to determine the offset in the angle, which may be the obstacle detection angle. For example, linear regression curve fitting, as discussed above, may be used to fit the first measurement data to obtain an angle. The angle may be compared with a predetermined reference angle, such as an angle calculated when the rotating radar 195 has been calibrated after being mounted onto the UAV 100, to determine a difference or offset in the angle. The offset may represent a radar wave offset (e.g., a deviation in the emitting direction or angle of the radar wave).

Method 1600 may include calculating, for each specified obstacle detection angle, an adjusted obstacle detection angle based on the specified obstacle detection angle and the offset (step 1615). In some embodiments, the processor may determine the adjusted obstacle detection angle by combining the original, specified obstacle detection angle with the offset in the angle. For example, when the original, specified obstacle detection angle is 0 degree, and the offset is 5 degrees, the original, specified obstacle detection angle may be adjusted for 5 degrees to arrive at the adjusted obstacle detection angle.

Method 1600 may include selecting data from the first measurement data corresponding to the adjusted obstacle detection angle as data for the specified obstacle detection angle (step 1620). After the adjusted obstacle detection angle is determined, the processor may not cause a physical adjustment to the obstacle detection angle of the radar element 410. Instead, because measurement data in 360 degrees have been obtained, the processor may select the data corresponding to the adjusted obstacle detection angle and use the selected data as if the selected data were the measurement data for the original, specified obstacle detection angle. For example, the processor may select the data corresponding to an angle 5 degrees away from the 0 degree position (original, specified obstacle detection angle), and use the selected data for the purpose of detecting a potential obstacle. The processor may analyze the selected data to detect whether there is an obstacle in the environment in the original, specified obstacle detection angle or direction.

Figure 17:
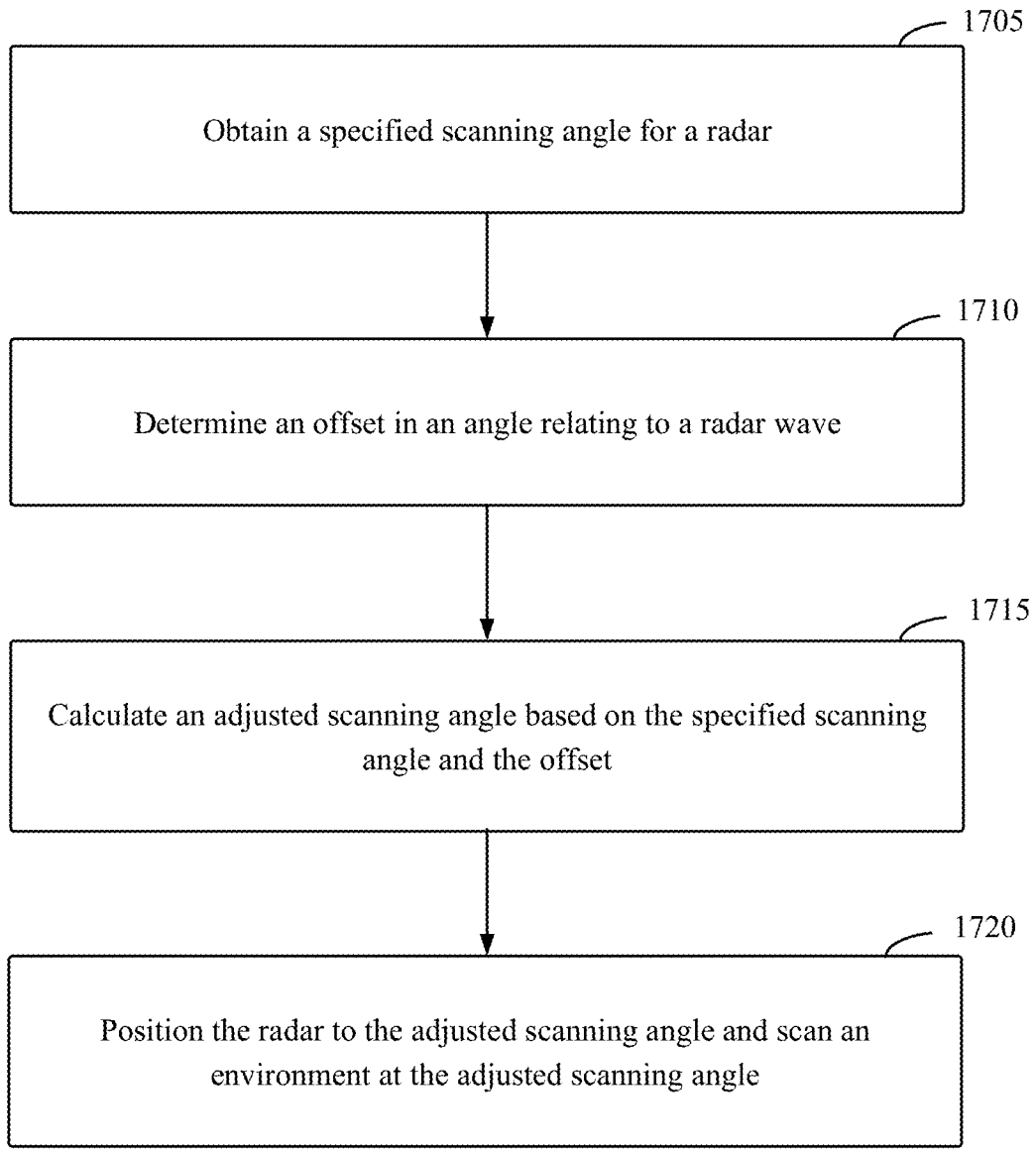
FIG. 17 is a flow chart illustrating a method for detecting a radar wave offset, in accordance with another embodiment of the present disclosure.

FIG. 17 is a flow chart illustrating a method for detecting a radar wave offset and/or for compensating for (or correcting) the offset. In some embodiments, method 1700 may be performed by a processor or controller included in the UAV 100. For example, the method 1700 may be performed by a processor included in the flight control device 220 (which may also be referred to as a controller 220). In some embodiments, the method 1700 may be performed by the rotating radar 195, such as a processor or controller included in rotating radar 195. In some embodiments, the method 1700 may be performed by a remote control device communicatively coupled with the UAV 100 and configured to control the flight and other operations of the UAV 100. The method 1700 may be executed to detect and/or correct the radar wave offset caused by deviations in the position and/or orientation of the rotating radar 195 due to improper mounting or vibration. The method 1700 may also be executed to detect and/or correct the radar wave offset caused by any other reasons, such as errors in the measurement data output from the attitude sensors.

Method 1700 may include obtaining a specified scanning angle for a radar (step 1705). For example, the processor may obtain a radar scanning angle, i.e., a direction in which the radar element 410 faces to scan for potential objects, such as obstacles. In some embodiments, the specified scanning angle may be input from a user. In some embodiments, the specified scanning angle may be obtained from a remote control device. In some embodiments, the specified scanning angle may be obtained from the flight control device 220.

Method 1700 may include determining an offset in an angle relating to a radar wave (step 1710). Any of the above described methods may be used to determine the offset in the angle, which may be the obstacle detection angle. For example, as discussed above, linear regression curve fitting may be used to fit the first measurement data to obtain an angle. The angle may be compared with a predetermined reference angle, such as an angle calculated when the rotating radar 195 has been calibrated after being mounted onto the UAV 100, to determine a difference or offset in the angle. The offset may represent a radar wave offset (e.g., a deviation in the emitting direction or angle of the radar wave).

Method 1700 may include calculating an adjusted scanning angle based on the specified scanning angle and the offset (step 1715). In some embodiments, the processor may determine the adjusted scanning angle by combining the original, specified scanning angle with the offset in the angle. For example, when the original, specified scanning angle is 0 degree, and the offset is 5 degrees, the original, specified scanning angle may be adjusted by 5 degrees to arrive at the adjusted scanning angle.

Method 1700 may include positioning the radar to the adjusted scanning angle and scanning an environment at the adjusted scanning angle (step 1720). For example, the processor may instruct the electric motor 411 to rotate, causing the radar element 410 to rotate from the original, specified scanning angle (or direction) to the adjusted scanning angle (or direction). The processor may cause the radar element 410 to scan the environment in the adjusted scanning angle. The processor may analyze measurement data obtained by the rotating radar 915 in the adjusted scanning angle to determine whether there is an obstacle or object in the environment.

According to the present disclosure, the deviation in the mounting of the rotating radar 195 can be detected using measurement data acquired by the rotating radar 195 based on radar signals reflected back by one or more arms of the UAV 100. Linear curve fitting may be applied to the measurement data to determine a slope. Comparing the slope with a predetermined slope may reveal whether the position and/or orientation of the rotating radar 195 have been changed due to, e.g., improper mounting or vibrations. The difference in the slopes may be used to adjust an obstacle detection angle of the rotating radar 195. Also according to the present disclosure, when the UAV 100 hovers in a horizontally stable state, attitude information may be obtained from the attitude sensors, such as the IMU, to detect whether there is an error in the data output from the IMU. The detected error may be used to adjust the obstacle detection angle of the rotating radar 195. In some embodiments, the present disclosure realizes automatic detection and compensation for or correction of the radar wave offset using computer software, thereby improving the accuracy of the detection and correction.

Variations of the disclosed methods may be used to detect changes in the position and/or orientation of the rotating radar 195 caused by, e.g., improper mounting. For example, in the above embodiments, the changes are detected based on the relative position (or distance) between the rotating radar 195 and members of the UAV 100, such as one or more arms. Alternatively, the changes may be detected based on a slope between the rotating radar 195 and the ground (e.g., a level ground). The value of the slope may be calculated in a manner similar to the method for calculating the slope between the arm and the rotating radar 195, as discussed above in connection with FIGS. 11B and 13. In some situations, however, it may be difficult to find a level ground, and a wavy ground may affect the detection results.

Variations of the disclosed methods may be used to detect errors in the output data of the attitude sensors, such as the IMU. For example, multiple IMU sensors or other attitude sensors may be added to increase the number of attitude sensors. Increasing the number of attitude sensors may increase the accuracy of measuring the attitude information of the UAV 100. Cost and complexity of the system, however, may also be increased.

Figure 18:
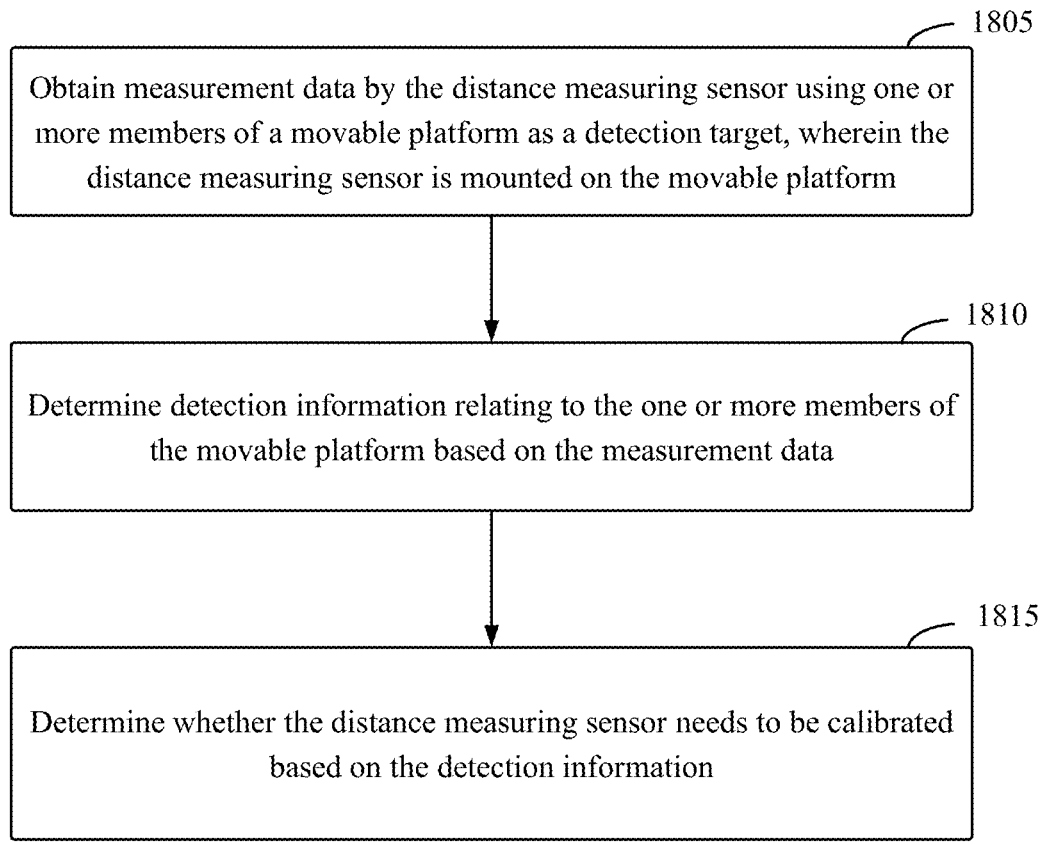
FIG. 18 is a flow chart illustrating a method for automatic calibration of a distance measuring sensor, in accordance with an embodiment of the present disclosure.

FIG. 18 is a flow chart illustrating a method 1800 for automatic calibration of a distance measuring sensor. The method 1800 may be performed by a controller included in the distance measuring sensor. The distance measuring sensor may include at least one of a microwave radar, a laser radar, a vision sensor (such as a stereo vision sensor), or an ultrasonic sensor, including the rotating radar 195. An embodiment of the controller may be a processor included in the rotating radar 195. In some embodiments, the distance measuring sensor is configured to detect a detection target through a rotating method, such as the rotating method discussed above in connection with the rotating radar 195. The rotating angle of the distance measuring sensor may be greater than, equal to, or smaller than 360 degrees. The distance measuring sensor may be configured to continuously rotate or intermittently rotate.

Method 1800 includes obtaining measurement data by the distance measuring sensor using one or more members of a movable platform as a detection target, wherein the distance measuring sensor is mounted on the movable platform (step 1805). The movable platform may include at least one of an unmanned aerial vehicle and an autonomous driving vehicle, including the UAV discussed above. In some embodiments, the one or more members may include at least one of: an arm of the unmanned aerial vehicle, a landing stand of the unmanned aerial vehicle, a communication antenna of the unmanned aerial vehicle, and an antenna of a positioning system of the unmanned aerial vehicle. In some embodiments, the measurement data relating to the detection target include tilt angles of the one or more members relative to the distance measuring sensor. The distance measuring sensor may include a signal transceiver configured to obtain measurement data relating to a detection target and a controller electrically coupled with the signal transceiver. Method 1800 may be performed by the controller included in the distance measuring sensor. The movable platform may include a body and the distance measuring sensor mounted on the body.

In some embodiments, obtaining the measurement data using one or more members of a movable platform as a detection target includes processing signals reflected by the one or more members. In some embodiments, processing the signals includes at least one of: obtaining time domain data signals, and processing the time domain data signals directly, processing the time domain data signals using windows, processing the time domain data signals using frequency transformation, or processing the time domain data signals using Constant False-Alarm Rate (CFAR) detection.

In some embodiments, the measurement data include at least one of an observation angle or an observation distance. The observation angle may be an angle when the distance measuring sensor receives signals when detecting the detection target. The observation angle may include at least one of an azimuth angle or a pitch angle. In some embodiments, the pitch angle is a tilt angle of a signal emitted by the distance measuring sensor relative to a rotating shaft of the distance measuring sensor in a direction perpendicular to the rotating shaft. In some embodiments, the azimuth angle is a tilt angle of a signal emitted by the distance measuring sensor relative to a rotating shaft of the distance measuring sensor in a direction parallel with the rotating shaft. In some embodiments, the observation distance includes a straight distance between the detection target and the distance measuring sensor.

Method 1800 also includes determining detection information relating to the one or more members of the movable platform based on the measurement data (step 1810). The detection information may include at least one of a geometric dimension information and location information. In some embodiments, the detection information comprises at least one of: an azimuth angle of the one or more members relative to the distance measuring sensor, a tilt angle of the one or more members relative to the distance measuring sensor, coordinates of the one or more members relative to the distance measuring sensor, a length of the one or more members, a height of the one or more members, a width of the one or more members, or a shape of the one or more members. In some embodiments, the detection information is determined based on observation distances corresponding to detection points on the one or more members of the movable platform and rotation angles of the distance measuring sensor. In some embodiments, the detection information includes a tilt angle of the one or more members relative to the distance measuring sensor. In some embodiments, the title angle is determined based on location information of the detection points on the one or more members. In some embodiments, the location information in a Cartesian coordinate system is determined based on observation distances corresponding to the detection points and rotation angles of the distance measuring sensor. In some embodiments, the tilt angle of the one or more members is determined based on a linear curve fitting of the location information.

Method 1800 also includes determining whether the distance measuring sensor needs to be calibrated based on the detection information (step 1815). In some embodiments, when determine that the distance measuring sensor needs to be calibrated, the controller is configured to calibrate an observation angle used by the distance measuring sensor for detecting the detection target based on the detection information. In some embodiments, the controller is configured to select corresponding measurement data based on calibrated rotation angles, wherein the measurement data correspond to the rotation angles on a one-on-one basis. The controller may also be configured to calculate calibrated detection information for the detection target based on the selected measurement data. In some embodiments, the distance measuring sensor is configured to emit detection signals based on the calibrated rotation angles.

Figure 19:
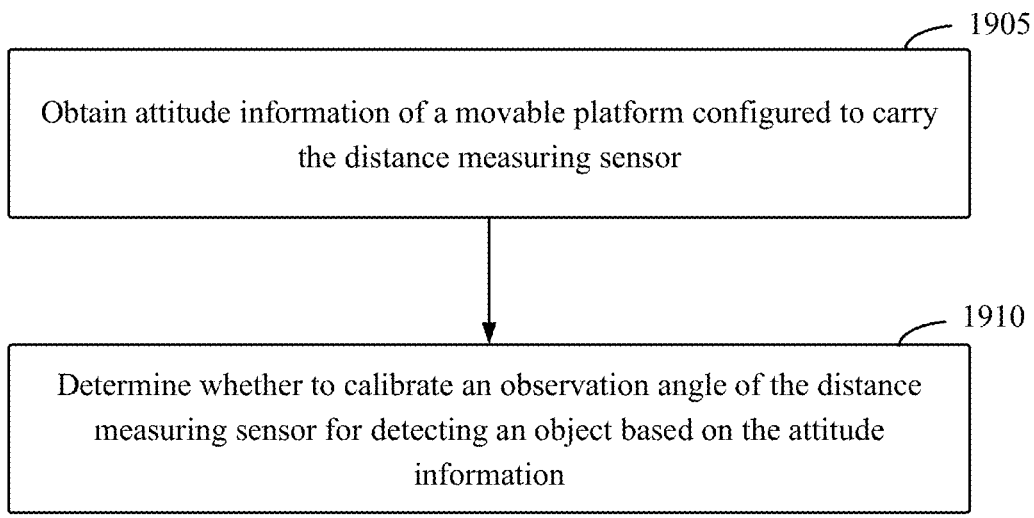
FIG. 19 is a flow chart illustrating another method for automatic calibration of a distance measuring sensor, in accordance with another embodiment of the present disclosure.

FIG. 19 is a flow chart illustrating another method for automatic calibration of a distance measuring sensor. Method 1900 may be performed by the controller of the distance measuring sensor. Method 1900 may include obtaining attitude information of a movable platform configured to carry the distance measuring sensor (step 1905). Method 1900 may also include determining whether to calibrate an observation angle of the distance measuring sensor for detecting an object based on the attitude information (step 1910). In some embodiments, the attitude information is obtained when the movable platform is in a predetermined state. In some embodiments, the predetermined state is a stable state of the movable platform. In some embodiments, in the stable state, the movable platform is configured to move at a constant speed. In some embodiments, in the stable state, the movable platform is configured to move along a straight line at the constant speed. In some embodiments, the attitude information includes at least one of a pitch angle, a roll angle, or a yaw angle. In some embodiments, the movable platform is an unmanned aerial vehicle, and the attitude information includes the pitch angle. In some embodiments, the controller is configured to determine whether to calibrate an observation angle of the distance measuring sensor for detecting an object based on differences between multiple average attitude information at multiple time instances when the movable platform is in the predetermined state. In some embodiments, the controller is configured to determine whether to calibrate an observation angle of the distance measuring sensor for detecting an object based on current attitude information when the movable platform is in the predetermined state. In some embodiments, the controller is configured to calibrate an observation angle of the distance measuring sensor for detecting an object based on differences between multiple average attitude information at multiple time instances when the movable platform is in the predetermined state. In some embodiments, the controller is configured to calibrate an observation angle of the distance measuring sensor for detecting an object based on a difference between current attitude information and reference information when the movable platform is in the predetermined state.

While embodiments of the present disclosure have been shown and described herein, it will be obvious to those skilled in the art that such embodiments are provided by way of example only. Numerous variations, changes, and substitutions will now occur to those skilled in the art without departing from the present disclosure. It should be understood that various alternatives to the embodiments of the invention described herein may be employed in practicing the present disclosure. It is intended that the following claims define the scope of the invention and that methods and structures within the scope of these claims and their equivalents be covered thereby.

What is claimed is:

1. A movable platform, comprising:
a body; and
a distance measuring sensor mounted on the body, the distance measuring sensor comprising a signal transceiver and a controller electrically coupled with the signal transceiver, the signal transceiver configured to obtain measurement data relating to a detection target, the measurement data including at least one of an azimuth observation angle or a pitch observation angle, the pitch observation angle being a tilt angle of a signal emitted by the distance measuring sensor relative to a rotating shaft of the distance measuring sensor in a direction perpendicular to the rotating shaft, the azimuth observation angle being a tilt angle of the signal emitted by the distance measuring sensor relative to the rotating shaft of the distance measuring sensor in a direction parallel to the rotating shaft, and the controller being configured to:
obtain the measurement data using one or more members of a movable platform as the detection target;
determine detection information relating to the one or more members of the movable platform based on the measurement data; and
determine whether the distance measuring sensor needs to be calibrated based on the detection information.

2. The movable platform of claim 1, wherein the detection information comprises at least one of geometric dimension information, location information, an azimuth angle of the one or more members relative to the distance measuring sensor, a tilt angle of the one or more members relative to the distance measuring sensor, coordinates of the one or more members relative to the distance measuring sensor, a length of the one or more members, a height of the one or more members, a width of the one or more members, or a shape of the one or more members.

3. The movable platform of claim 1, wherein the distance measuring sensor comprises at least one of a microwave radar, a laser radar, or an ultrasonic sensor.

4. The movable platform of claim 1, wherein the distance measuring sensor is configured to detect the detection target through a rotating method.

5. The movable platform of claim 4, wherein a rotating angle of the distance measuring sensor is greater than 360 degrees.

6. The movable platform of claim 4, wherein a rotating angle of the distance measuring sensor is smaller than 360 degrees.

7. The movable platform of claim 4, wherein the distance measuring sensor is configured to continuously rotate or intermittently rotate.

8. The movable platform of claim 1, wherein:
the movable platform is an unmanned aerial vehicle; and
the one or more members comprise at least one of: an arm of the unmanned aerial vehicle, a landing stand of the unmanned aerial vehicle, a communication antenna of the unmanned aerial vehicle, or an antenna of a positioning system of the unmanned aerial vehicle.

9. The movable platform of claim 8, wherein the measurement data relating to the detection target comprises tilt angles of the one or more members relative to the distance measuring sensor.

10. The movable platform of claim 9, wherein the controller is configured to obtain the measurement data using the one or more members of the movable platform as the detection target by processing signals reflected by the one or more members.

11. The movable platform of claim 10, wherein the controller is configured to process the signals based on:
obtaining time domain data signals; and
performing at least one of:
processing the time domain data signals directly;
processing the time domain data signals using windows;
processing the time domain data signals using frequency transformation; or processing the time domain data signals using Constant False-Alarm Rate (CFAR) detection.

12. The movable platform of claim 10, wherein the measurement data further comprises an observation distance, the observation distance comprising a straight distance between the detection target and the distance measuring sensor.

13. The movable platform of claim 1, wherein the detection information is determined based on observation distances corresponding to detection points on the one or more members of the movable platform and rotation angles of the distance measuring sensor.

14. The movable platform of claim 13, wherein the detection information comprises a tilt angle of the one or more members relative to the distance measuring sensor, the title angle being determined based on location information of the detection points on the one or more members.

15. The movable platform of claim 14, wherein the location information in a Cartesian coordinate system is determined based on the observation distances corresponding to the detection points and the rotation angles of the distance measuring sensor.

16. The movable platform of claim 15, wherein the tilt angle of the one or more members is determined based on a linear curve fitting of the location information.

17. The movable platform of claim 1, wherein the controller is configured to calibrate the observation angle used by the distance measuring sensor for detecting the detection target based on the detection information.

18. The movable platform of claim 17, wherein the controller is configured to:

select corresponding measurement data based on calibrated rotation angles, wherein the measurement data correspond to the rotation angles on a one-on-one basis; and calculate calibrated detection information for the detection target based on the selected measurement data.

19. The movable platform of claim 18, wherein the distance measuring sensor is configured to emit detection signals based on the calibrated rotation angles.

* * * * *